US012578417B2

(12) United States Patent
Hirzallah et al.

(10) Patent No.: US 12,578,417 B2
(45) Date of Patent: Mar. 17, 2026

(54) DISPLACEMENT POSITIONING SIGNALING AND REPORTING

(71) Applicant: QUALCOMM Incorporated, San Diego, CA (US)

(72) Inventors: Mohammed Ali Mohammed Hirzallah, San Diego, CA (US); Marwen Zorgui, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 18/295,784

(22) Filed: Apr. 4, 2023

(65) Prior Publication Data

US 2024/0337720 A1     Oct. 10, 2024

(51) Int. Cl.
*G01S 5/02*          (2010.01)
*H04B 17/27*         (2015.01)
          (Continued)

(52) U.S. Cl.
CPC ........... *G01S 5/0252* (2013.01); *H04B 17/27* (2015.01); *H04B 17/318* (2015.01); *H04W 64/006* (2013.01)

(58) Field of Classification Search
CPC ...... G01S 5/0252; G01S 5/021; G01S 5/0278; G01S 5/02525; G01S 5/0036; G01S 5/0236; G01S 5/0244; G01S 5/0027; G01S 5/0294; G01S 5/10; G01S 5/02521; G01S 5/0273; G01S 5/0009; G01S 5/0268; G01S 7/417; G01S 13/765; G01S 1/042;
          (Continued)

(56) References Cited

U.S. PATENT DOCUMENTS

2022/0240322 A1     7/2022  Duan et al.
2022/0312151 A1*    9/2022  Yerramalli ............ H04W 4/029
          (Continued)

FOREIGN PATENT DOCUMENTS

WO          2023015053 A1      2/2023
WO      WO-2024173459 A1 *     8/2024  .......... H04W 64/006

OTHER PUBLICATIONS

Neural-Network-Assisted UE Localization Using Radio-Channel Fingerprints in LTE Networks (Year: 2017).*
          (Continued)

*Primary Examiner* — Nimesh Patel
(74) *Attorney, Agent, or Firm* — Procopio, Cory, Hargreaves & Savitch LLP

(57)          ABSTRACT

A first network node may receive a first set of sounding reference signals (SRSs) and a second set of SRSs from a wireless device. The first network node may measure the first set of SRSs and the second set of SRSs. The first network node may calculate a set of displacement radio frequency fingerprint (RFFP) measurements based on the measured first set of SRSs and measured second set of SRSs. The first network node may output the set of displacement RFFP measurements to a positioning model by locally calculating the set of displacement information using the positioning model based on the set of displacement RFFP measurements or by transmitting the set of displacement RFFP measurements to a second network node to calculate a set of displacement information using the positioning model.

30 Claims, 14 Drawing Sheets

800

(51) Int. Cl.
   *H04B 17/318*      (2015.01)
   *H04W 64/00*       (2009.01)

(58) Field of Classification Search
   CPC ................ G01S 5/02523; G01S 19/45; G01S
      2205/008; G01S 19/48; G01S 5/0063;
      G01S 5/0263; G01S 5/02955; G01S
      13/02; G01S 5/0246; G01S 7/003; G01S
      13/003; G01S 13/36; G01S 13/46; G01S
      2013/462; G01S 5/0242; G01S 5/0264;
      G01S 5/011; H04B 17/27; H04B 17/318;
      H04B 17/364; H04B 7/0617; H04B
      7/06966; H04B 1/48; H04B 17/391;
      H04B 17/3913; H04B 7/0626; H04B
      7/0632; H04W 64/006; H04W 24/10;
      H04W 64/00; H04W 4/029; H04W
      64/003; H04W 88/18; H04W 72/23;
      H04W 92/18; H04W 48/08; H04W 4/02;
      H04W 72/20; H04W 24/04; H04W 72/51;
      H04W 16/28; H04W 72/0453; H04W
      72/25; H04L 5/0053; H04L 5/005; H04L
      5/0051; H04L 5/0048; H04L 41/16; H04L
      5/0055; H04L 25/0204; H04L 25/0224;
      G06N 20/00; G06N 20/10; G06N 20/20;
      G06N 3/084; G06N 3/09; G06N 3/044;
      G06N 3/08; G06N 5/01
   See application file for complete search history.

(56) References Cited

U.S. PATENT DOCUMENTS

| | | | | |
|---|---|---|---|---|
| 2023/0354248 | A1* | 11/2023 | Hirzallah | ................ G01S 7/417 |
| 2024/0133995 | A1* | 4/2024 | Hirzallah | ............. G06N 3/0895 |
| 2024/0230828 | A9* | 7/2024 | Hirzallah | ............. G06N 3/0895 |
| 2024/0275547 | A1* | 8/2024 | Hirzallah | .................. G01S 5/02 |
| 2024/0295625 | A1* | 9/2024 | Hasegawa | ............ G01S 5/0263 |
| 2024/0414680 | A1* | 12/2024 | Chuang | ............ H04W 56/0065 |

OTHER PUBLICATIONS

International Search Report and Written Opinion—PCT/US2024/021499—ISA/EPO—Jun. 24, 2024.
Qualcomm Incorporated: "Other Aspects on AI-ML for Positioning Accuracy Enhancement", 3GPP TSG RAN WG1 #110, R1-2207229, 3rd Generation Partnership Project, Mobile Competence Centre, 650, Route Des Lucioles, F-06921 Sophia-Antipolis Cedex, France, vol. RAN WG1, No. Toulouse, France, Aug. 22, 2022-Aug. 26, 2022, Aug. 12, 2022, 16 Pages, XP052275165, p. 6, para 4 RF Fingerprinting-pg15, para 8 Other aspects of ML, Figures 1-3, p. 1, para 1 Introduction.

* cited by examiner $\Phi$ = Azimuth angle of departure (A-AoD)
$\theta$ = Zenith angle of departure (Z-AoD)
$\rho$ = Distance
$\Phi'$ = Azimuth angle of arrival (A-AoA)
$\theta'$ = Zenith angle of arrival (Z-AoA)

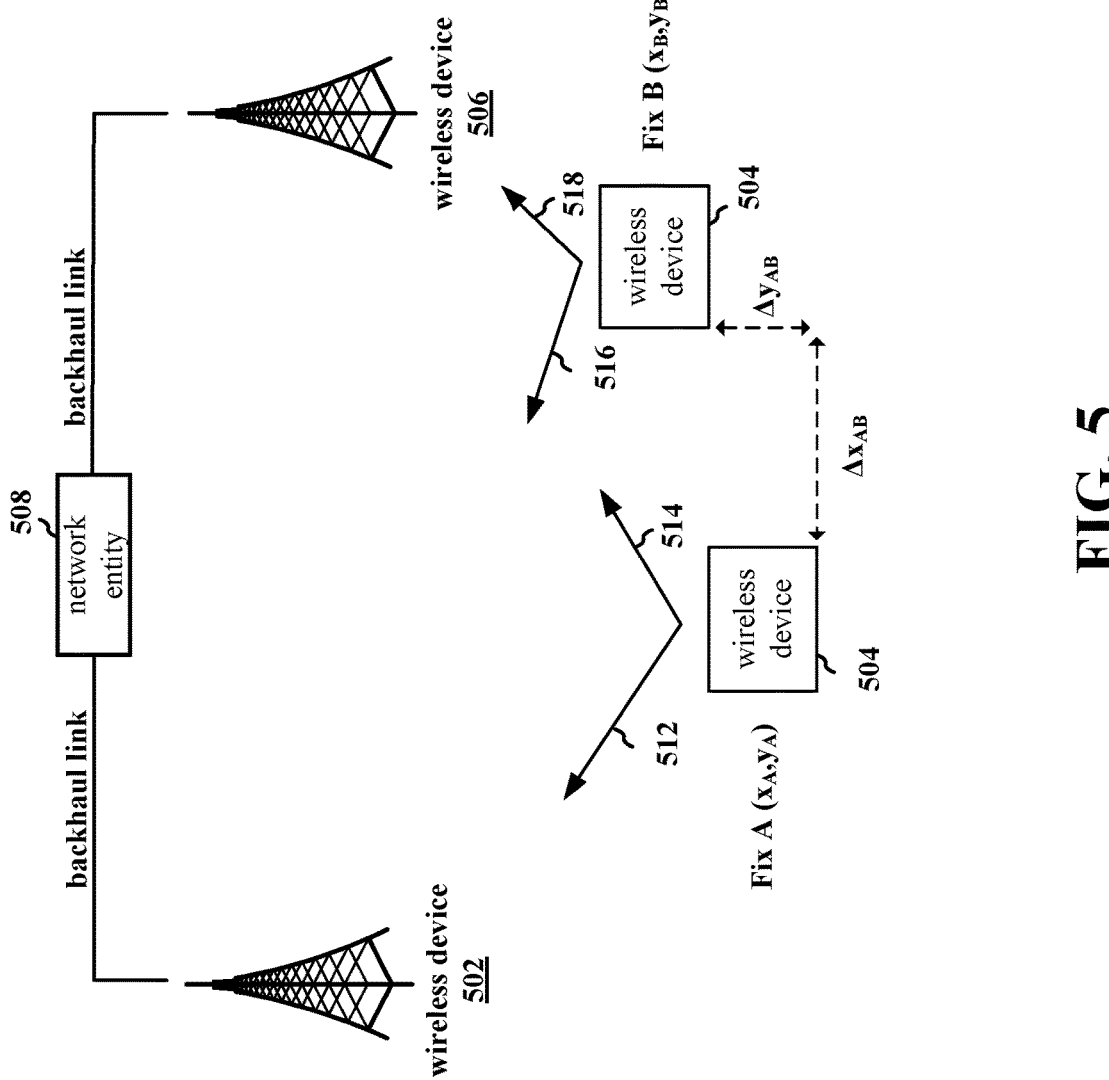
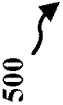
FIG. 5

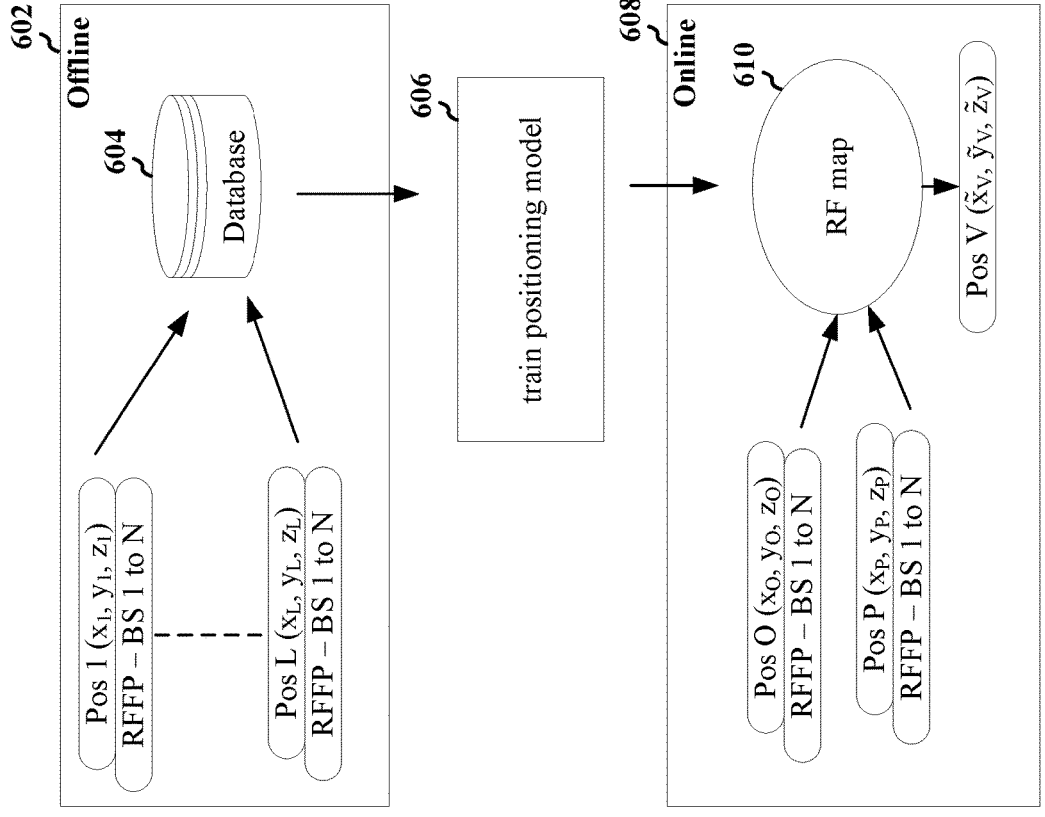
FIG. 6

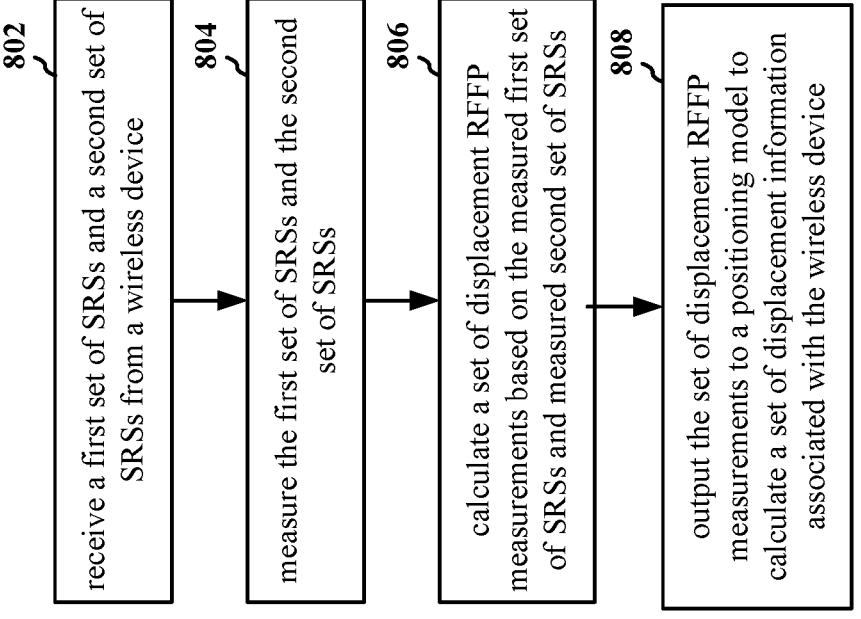

802 receive a first set of SRSs and a second set of SRSs from a wireless device

804 measure the first set of SRSs and the second set of SRSs

806 calculate a set of displacement RFFP measurements based on the measured first set of SRSs and measured second set of SRSs

808 output the set of displacement RFFP measurements to a positioning model to calculate a set of displacement information associated with the wireless device

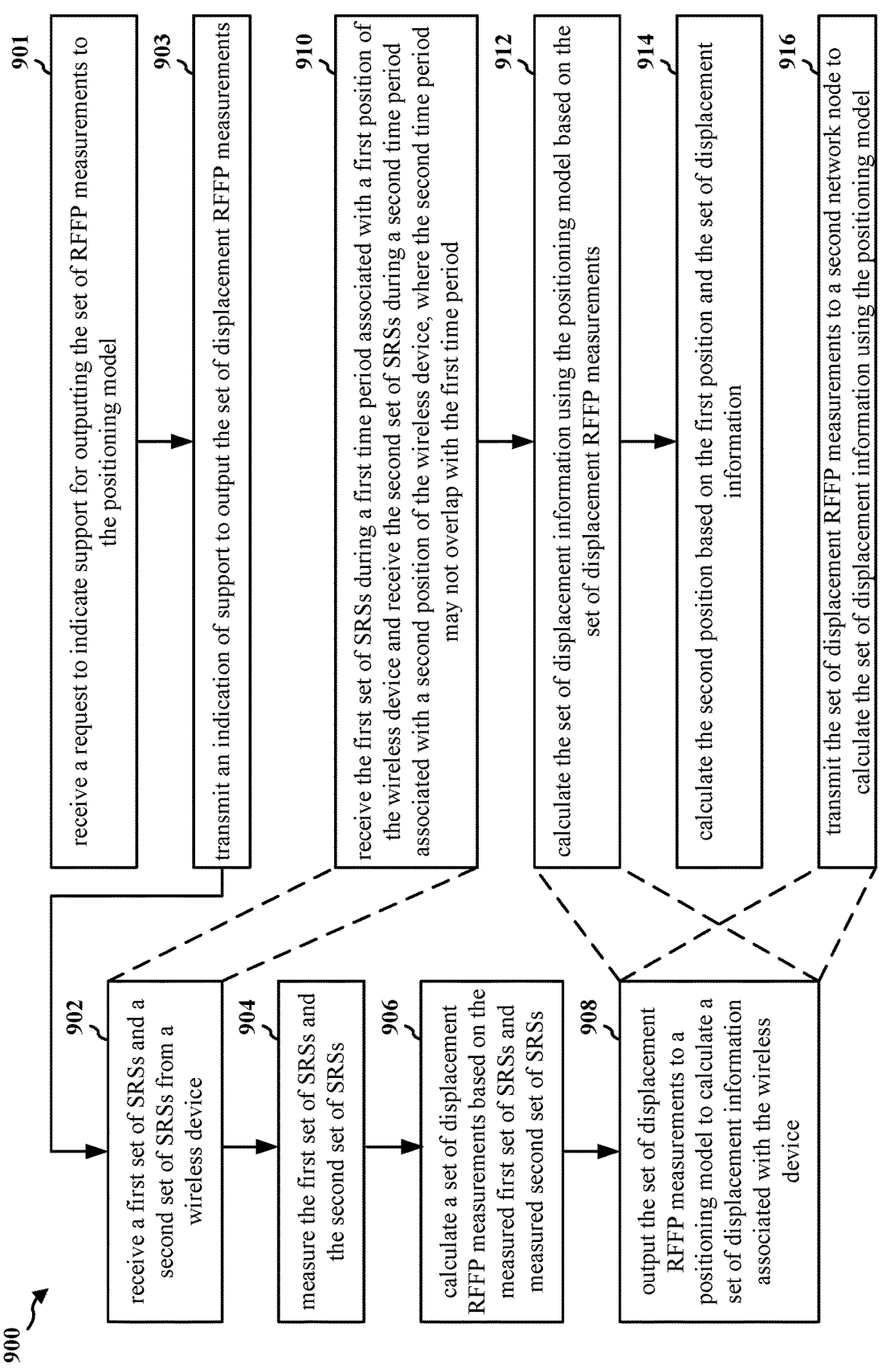

FIG. 9

901 receive a request to indicate support for outputting the set of RFFP measurements to the positioning model 903 transmit an indication of support to output the set of displacement RFFP measurements 910 receive the first set of SRSs during a first time period associated with a first position of the wireless device and receive the second set of SRSs during a second time period associated with a second position of the wireless device, where the second time period may not overlap with the first time period 912 calculate the set of displacement information using the positioning model based on the set of displacement RFFP measurements 914 calculate the second position based on the first position and the set of displacement information 916 transmit the set of displacement RFFP measurements to a second network node to calculate the set of displacement information using the positioning model

900

902 receive a first set of SRSs and a second set of SRSs from a wireless device 904 measure the first set of SRSs and the second set of SRSs 906 calculate a set of displacement RFFP measurements based on the measured first set of SRSs and measured second set of SRSs 908 output the set of displacement RFFP measurements to a positioning model to calculate a set of displacement information associated with the wireless device

1100

1102 transmit a configuration for a positioning model associated with a first set of SRSs and a second set of SRSs to a first network node

1104 receive a set of displacement RFFP measurements for the positioning model based on the first set of SRSs and the second set of SRSs

1106 receive a set of displacement information calculated using the positioning model based on the set of RFFP measurements and the configuration

FIG. 11

DISPLACEMENT POSITIONING SIGNALING AND REPORTING

TECHNICAL FIELD

The present disclosure relates generally to communication systems, and more particularly, to a wireless positioning system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a first network node. The apparatus may receive a first set of sounding reference signals (SRSs) and a second set of SRSs from a wireless device. The wireless device may be a user equipment (UE), a positioning reference unit (PRU), or another network node. The apparatus may measure the first set of SRSs and the second set of SRSs. The apparatus may calculate a set of displacement radio frequency fingerprint (RFFP) measurements based on the measured first set of SRSs and measured second set of SRSs. The apparatus may output the set of displacement RFFP measurements to a positioning model to calculate a set of displacement information associated with the wireless device.

In an aspect of the disclosure, a method, a computer-readable medium, and an apparatus are provided. The apparatus may include a second network node. The apparatus may transmit a configuration for a positioning model associated with a first set of SRSs and a second set of SRSs to a first network node. The apparatus may receive a set of displacement RFFP measurements for the positioning model based on the first set of SRSs and the second set of SRSs. The apparatus may receive a set of displacement information calculated using the positioning model based on the set of RFFP measurements and the configuration.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 5 is a diagram illustrating an example of displacement positioning based on reference signal measurements.

FIG. 6 is a diagram illustrating an example of positioning model training based on an offline database of known radio frequency fingerprint (RFFP) measurements and positions.

FIG. 8 is a flowchart of a method of wireless communication.

FIG. 9 is a flowchart of a method of wireless communication.

FIG. 11 is a flowchart of a method of wireless communication.

DETAILED DESCRIPTION

Figure 1:
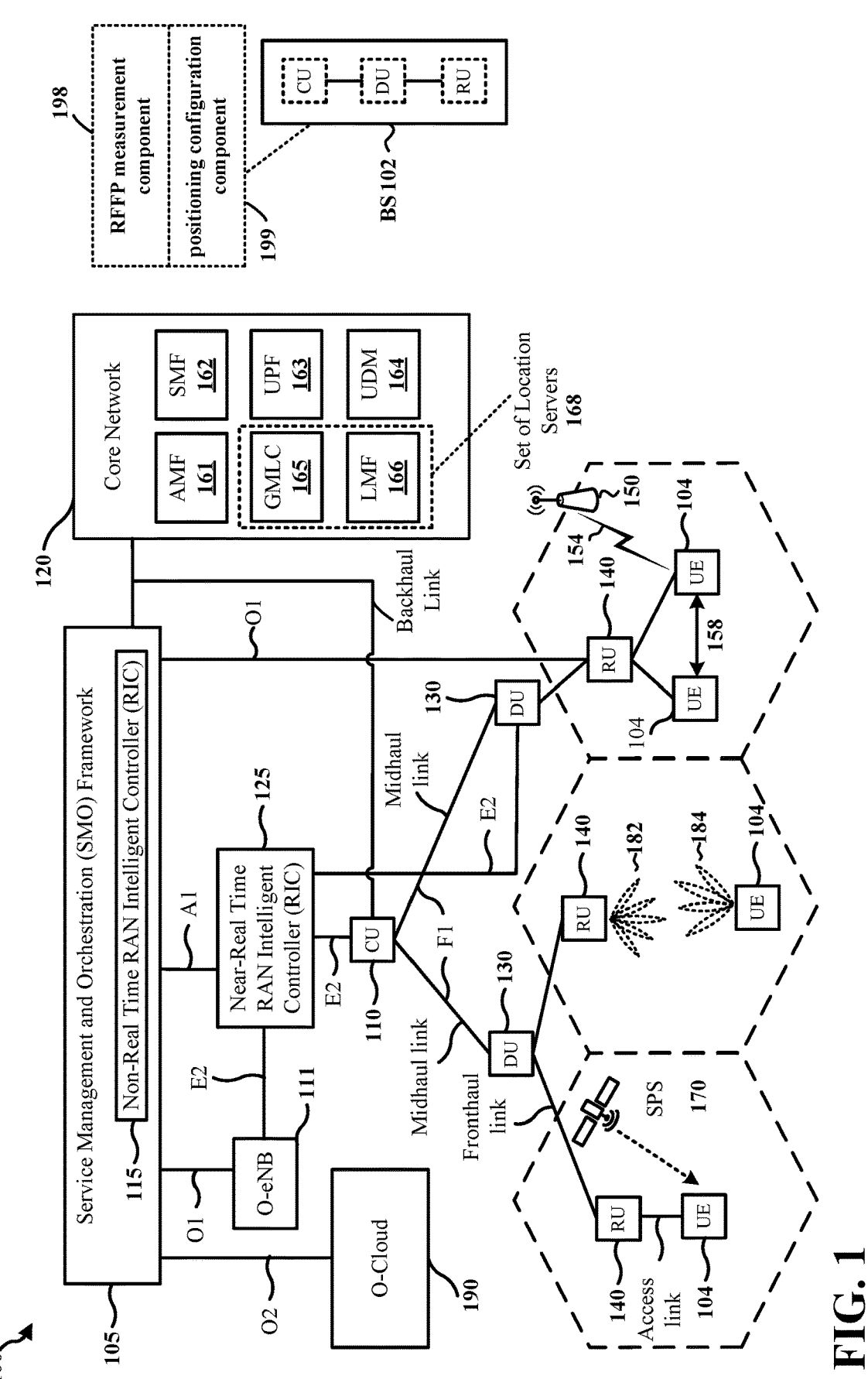
FIG. 1 is a diagram illustrating an example of a wireless communications system and an access network.

Various aspects relate generally to a positioning system. Some aspects more specifically relate to a positioning system that calculates a set of displacement information to determine a position of a wireless device. In some examples, a positioning model may be used to calculate a set of displacement information based on a set of displacement radio frequency fingerprint (RFFP) measurements based on a first set of SRSs associated with a first position of a wireless device and a second set of SRSs associated with a second position of the wireless device.

In some aspects, in response to a request from a network entity, such as a location management function (LMF), a network node may respond with its capability to either conduct (e.g., next generation (NG) radio access network (NG-RAN) node based) or assist (NG-RAN node assisted) in displacement positioning using a positioning model. The positioning model may be generated using artificial intelligence (AI)/machine learning (ML) (AI/ML or AIML). The network entity may configure the network node for displacement positioning utilizing a positioning model. In one aspect, a network node may observe SRS signals transmitted over two (or multiple) time resources and derives displacement RFFP measurements and reports them to the network entity. The network entity may then leverage the reported displacement RFFP measurements to infer target displacement information. In another aspect, the reported displacement RFFP measurements may be a composition of RFFPs obtained at two different timing instants. In another aspect the network node may observe SRS signals sent over two (or multiple) time resources, derive displacement RFFP measurements, conduct inference of displacement info based on a network node-side positioning model, and report displacement info to the network entity. In one aspect, the network entity's configuration for the network node may include a time resolution between SRS resources considered for displacement positioning, a periodicity of positioning, and/or whether the network node may adapt the time resolution between resources included for positioning to account for target speed. In one aspect, a positioning model may estimate positioning displacement metrics at a network (NW). The output of the positioning model may be displacement information of a target UE and input may be a displacement radio fingerprint constructed by preprocessing a first measurement and a second measurement. The first measurement may correspond with a first signal sent by the target UE at a first fix and observed at first set of transmission reception points (TRPs). The second measurement may correspond with a second signal sent by the target UE at a second fix and observed at a second set of TRPs. TRPs may report the displacement fingerprint to a network entity and/or location server for inference; or may exchange the displacement fingerprint if the inference happens at a network node. In one aspect, the first and second signals may be uplink (UL) reference signals (e.g., sounding reference signals (SRSs)). In one aspect, the first and second set of TRPs may be the same. In one aspect, the displacement RFFP of first and second measurements may be composition of channel impulse response (CIR), channel frequency response (CFR), histogram of a reference signal strength indicator (RSSI), reference signal received quality (RSRQ), reference signal received power (RSRP), delay spread, angle spread, angle of arrival (AoA) angles, angle of departure (AoD) angles, Doppler spread, or any combinations captured at single or multiple antenna ports. In one aspect, the positioning model may be trained using labels generated based on the information from target records sensor whose timing falls between the timing of the first and second signal sets. In one aspect, the positioning model may be trained at a location server or at a third-party server.

A first network node may receive a first set of sounding reference signals (SRSs) and a second set of SRSs from a wireless device. The first network node may measure the first set of SRSs and the second set of SRSs. The first network node may calculate a set of displacement radio frequency fingerprint (RFFP) measurements based on the measured first set of SRSs and measured second set of SRSs. The first network node may output the set of displacement RFFP measurements to a positioning model by locally calculating the set of displacement information using the positioning model based on the set of displacement RFFP measurements or by transmitting the set of displacement RFFP measurements to a second network node (e.g., a network entity, such as a location management function (LMF) to calculate a set of displacement information using the positioning model.

Particular aspects of the subject matter described in this disclosure can be implemented to realize one or more of the following potential advantages. In some examples, by calculating a set of displacement information based on a set of displacement RFFP measurements taken at a network node, a position/location of a wireless device, such as a UE, may be calculated using less energy to perform RF positioning and tracking. Such a system may employ hybrid displacement-full positioning by performing full positioning at a first position and displacement positioning at a second location after performing full positioning at the first position. Less resources may be used as displacement information may be reported instead of measurements for each positioning occasion (e.g., the first full positioning occasion and the second displacement positioning occasion). In some aspects, wireless devices may be configured to generate training data for positioning models that bootstrap different positioning label types (e.g., displacement information, anchor information) to improve efficiency and/or accuracy. Accurate positioning may be calculated using a positioning model by calculating displacement information without use of resource-intensive sensors at the wireless device. In some aspects, sensor outputs may be enhanced by fusing displacement information calculated based on RFFP displacement measurements with sensor outputs. The displacement information may also be used to train other positioning models.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHZ), FR4 (71 GHZ-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, cNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the base station 102 may have a radio frequency fingerprint (RFFP) measurement component 198 that may be configured to receive a first set of sounding reference signals (SRSs) and a second set of SRSs from a wireless device. The wireless device may be, for example, a UE, a positioning reference unit (PRU), or another base station. The RFFP measurement component 198 may be configured to measure the first set of SRSs and the second set of SRSs. The RFFP measurement component 198 may be configured to calculate a set of displacement RFFP measurements based on the measured first set of SRSs and measured second set of SRSs. The RFFP measurement component 198 may be configured to output the set of displacement RFFP measurements to a positioning model to calculate a set of displacement information associated with the wireless device. In certain aspects, the base station 102, for example the LMF 166 or the one or more location servers 168, may have a positioning configuration component 199. The positioning configuration component 199 may be configured to transmit a configuration for a positioning model associated with a first set of SRSs and a second set of SRSs to a first network node. The positioning configuration component 199 may be configured to receive a set of displacement RFFP measurements for the positioning model based on the first set of SRSs and the second set of SRSs. The positioning configuration component 199 may be configured to receive a set of displacement information calculated using the positioning model based on the set of RFFP measurements and the configuration. The positioning configuration component 199 may configure a set of base stations, such as the base station 102, to perform positioning on a wireless device, such as the UE 104, while the wireless device transmits sets of SRSs from a plurality of locations. The RFFP measurement component 198 may measure the sets of SRSs from the wireless device, and may use a positioning model to calculate a set of displacement information based on the measured sets of SRSs.

Figures 2A, 2B, 2C, 2D:
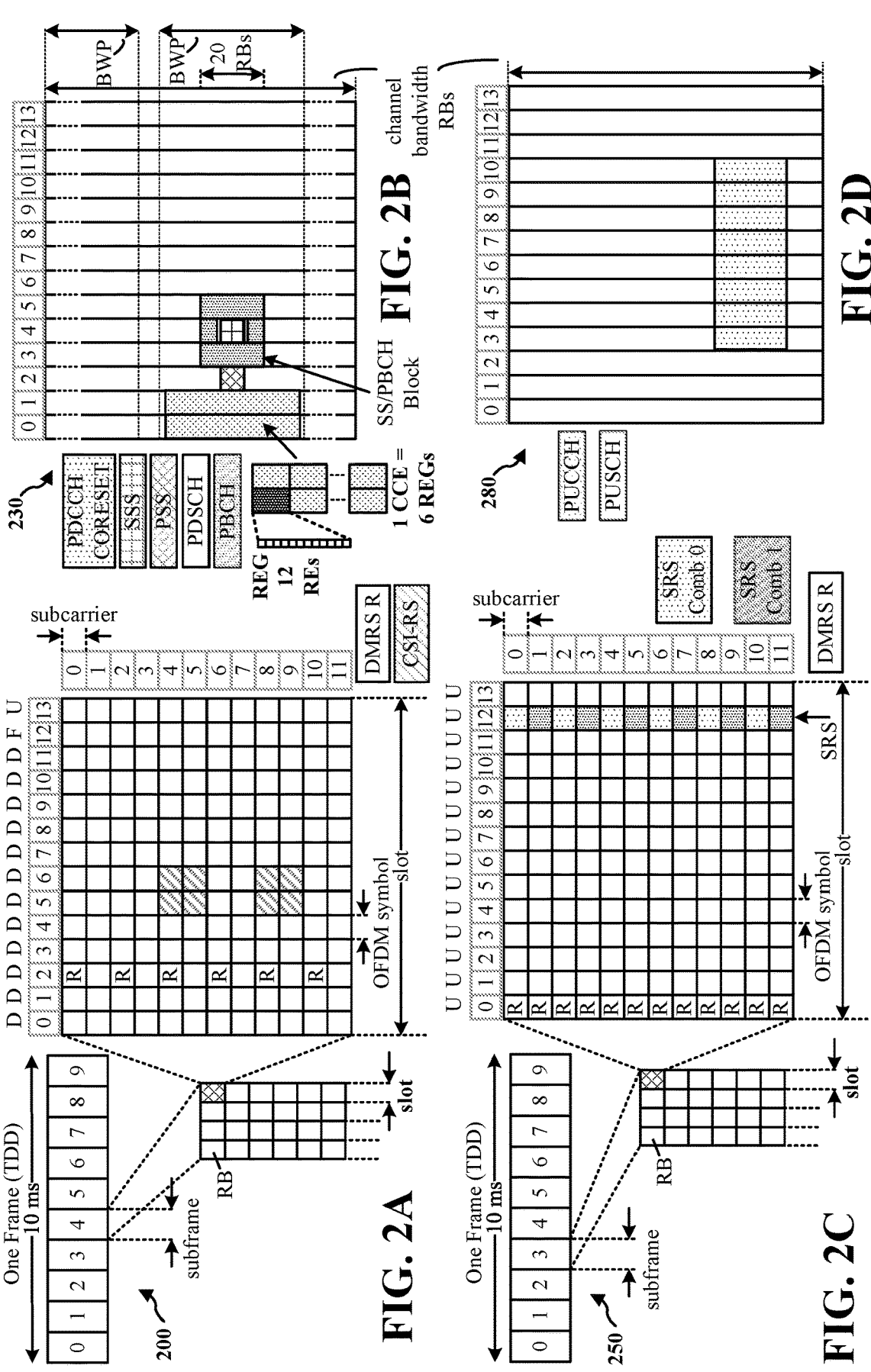
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| | Numerology, SCS, and CP | |
| --- | --- | --- |
| $\mu$ | SCS $\Delta f = 2^\mu \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
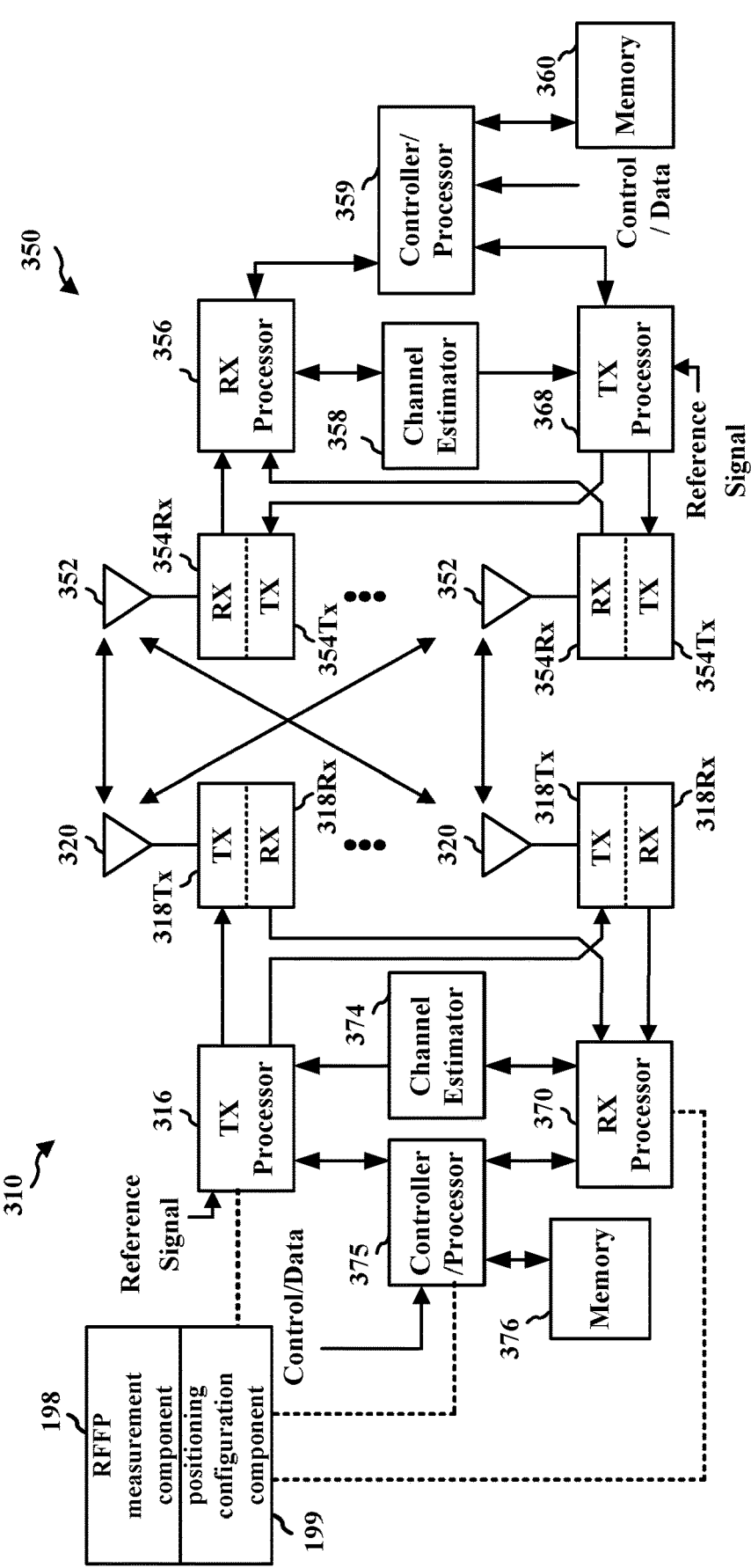
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 316, the RX processor 370, and the controller/processor 375 may be configured to perform aspects in connection with the RFFP measurement component 198 of FIG. 1.

At least one of the TX processor 316, the RX processor 370, and the controller/processor 375 may be configured to perform aspects in connection with the positioning configuration component 199 of FIG. 1.

Figure 4:
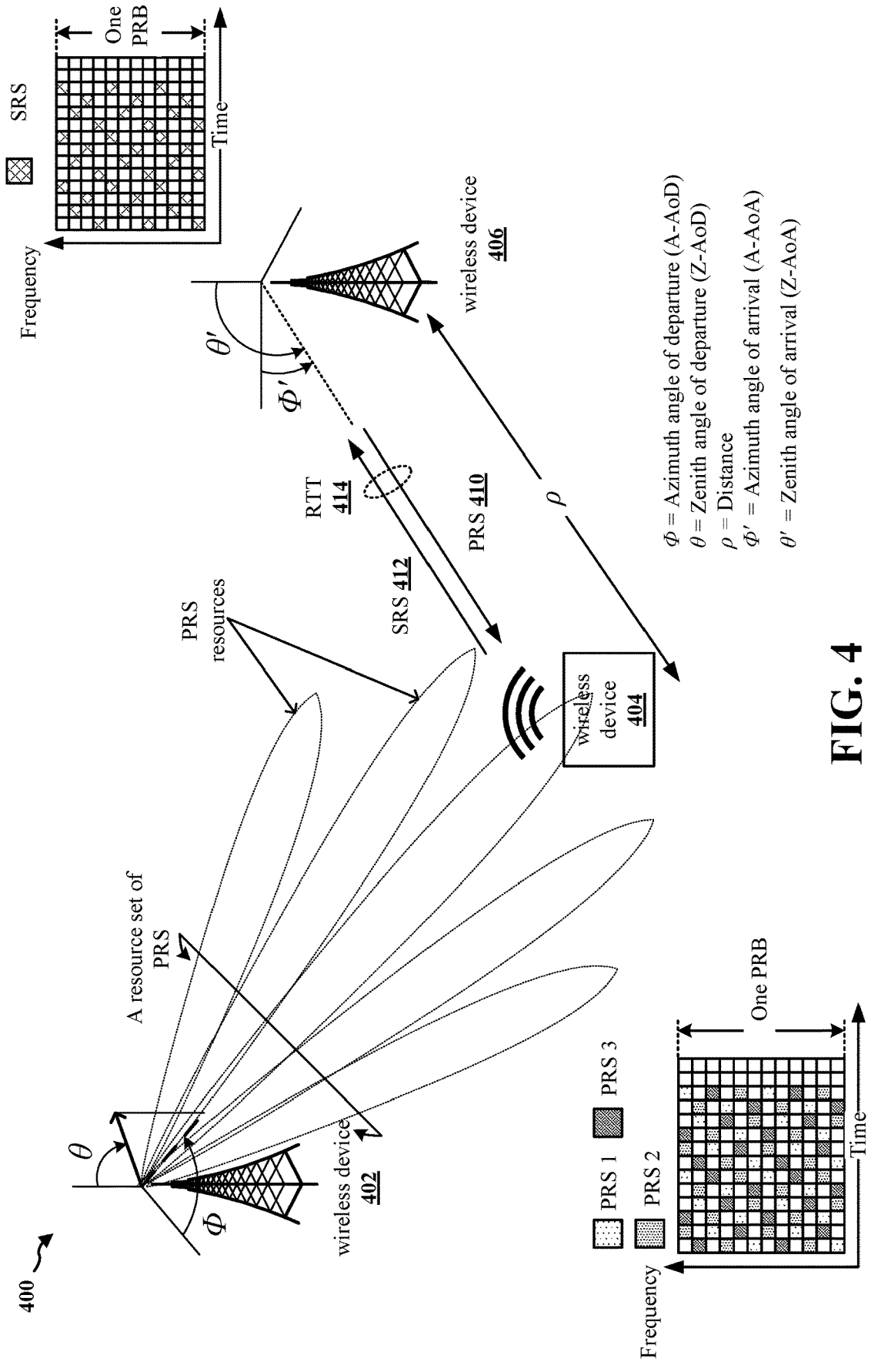
FIG. 4 is a diagram illustrating an example of positioning based on reference signal measurements.

FIG. 4 is a diagram 400 illustrating an example of positioning based on reference signal measurements. The wireless device 402 may be a UE, a base station, or a positioning reference unit (PRU). The wireless device 404 may be a UE, a base station, or a PRU. The wireless device 406 may be a UE, a base station, or a PRU. The wireless device 402 may be referred to as a positioning target wireless device, whose location may be calculated based on measurements of one or more reference signals. The wireless device 404 and the wireless device 406 may be referred to as positioning neighbor wireless devices, whose locations may be known, which may be used to calculate the location of the wireless device 402. The wireless device 404 may transmit SRS 412 at time $T_{SRS\_TX}$ to the wireless device 406. The wireless device 404 may receive positioning reference signals (PRS) 410 at time $T_{PRS\_RX}$ from the wireless device 406. The SRS 412 may be an UL-SRS. The PRS 410 may be a DL-PRS. In some aspects, the wireless device 402 may be a TRP and the wireless device 406 may be a TRP, which may be both configured to transmit DL-PRS to the wireless device 404. The wireless device 404 may be a UE configured to transmit UL-SRS to the wireless device 402 and the wireless device 406.

The wireless device 406 may receive the SRS 412 at time $T_{SRS\_RX}$ from the wireless device 404 and transmit the PRS 410 at time $T_{PRS\_TX}$ to the wireless device 404. The wireless device 404 may receive the PRS 410 before transmitting the SRS 412. The wireless device 404 may transmit the SRS 412 before receiving the PRS 410. The wireless device 404 may transmit the SRS 412 in response to receiving the PRS 410. The wireless device 406 may transmit the PRS 410 in response to receiving the SRS 412. A positioning server (e.g., location server(s) 168), the wireless device 404, or the wireless device 406 may determine the round-trip-time (RTT) 414 based on $\|T_{SRS\_RX}-T_{PRS\_TX}|-|T_{SRS\_TX}-T_{PRS\_RX}\|$. Multi-RTT positioning may make use of the Rx-Tx time difference measurements (i.e., $|T_{SRS\_TX}-T_{PRS\_RX}|$) and PRS reference signal received power (RSRP) (PRS-RSRP) of PRS signals received from multiple wireless devices, such as the wireless device 402 and the wireless device 406, which are measured by the wireless device 404, and the measured Rx-Tx time difference measurements (i.e., $|T_{SRS\_RX}-T_{PRS\_TX}|$) and SRS-RSRP at multiple wireless devices, such as at the wireless device 402 and at the wireless device 406 of SRS transmitted from wireless device 404. The wireless device 404 may measure the Rx-Tx time difference measurements, and/or PRS-RSRP of the received signals, using assistance data received from the positioning server, the wireless device 402, and/or the wireless device 406. The wireless device 402 and the wireless device 406 may measure the Rx-Tx time difference measurements, and/or SRS-RSRP of the received signals, using assistance data received from the positioning server. The measurements may be used at the positioning server or the wireless device 404 to determine the RTT, which may be used to estimate the location of the wireless device 404. Other methods are possible for determining the RTT, such as for example using time-difference of arrival (TDOA) measurements, such as DL-TDOA and/or UL-TDOA measurements.

DL-AoD positioning may make use of the measured PRS-RSRP of signals transmitted from multiple wireless devices, such as the wireless device 402 and the wireless device 406, and received at the wireless device 404. The AoD positioning may also be referred to as DL-AoD positioning where the PRS are DL signals. The wireless device 404 may measure the PRS-RSRP of the received signals using assistance data received from the positioning server, and the resulting measurements may be used along with the azimuth angle of departure (A-AoD), the zenith angle of departure (Z-AoD), and other configuration information to locate the wireless device 404 in relation to the neighboring wireless devices that transmitted the PRS, such as the wireless device 402 and the wireless device 406.

DL-TDOA positioning may make use of the DL reference signal time difference (RSTD), and/or PRS-RSRP of signals received from multiple wireless devices, such as the wireless device 402 and the wireless device 406, at the wireless device 404. The wireless device 404 may measure the RSTD, and/or the PRS-RSRP, of the received PRS signals using assistance data received from the positioning server, and the resulting measurements may be used along with other configuration information to locate the wireless device 404 in relation to the neighboring wireless devices that transmitted the PRS, such as the wireless device 402 and the wireless device 406.

UL-TDOA positioning may make use of the UL relative time of arrival (RTOA), and/or SRS-RSRP, at multiple wireless devices, such as the wireless device 402 and the wireless device 406, of signals transmitted from the wireless device 404. The wireless devices, such as the wireless device 402 and the wireless device 406, may measure the RTOA, and/or the SRS-RSRP, of the received signals using assistance data received from the positioning server, and the resulting measurements may be used along with other configuration information to estimate the location of the wireless device 404.

UL-AoA positioning may make use of the measured azimuth angle of arrival (A-AoA) and zenith angle of arrival (Z-AoA) at multiple wireless devices, such as the wireless device 402 and the wireless device 406, of signals transmitted from the wireless device 404. The wireless device 402 and the wireless device 406 may measure the A-AoA and the Z-AoA of the received signals using assistance data received from the positioning server, and the resulting measurements may be used along with other configuration information to estimate the location of the wireless device 404.

Additional positioning methods may be used for estimating the location of the wireless device 404, such as for example, UL-AoD and/or DL-AoA at the wireless device 404. Note that data/measurements from various technologies may be combined in various ways to increase accuracy, to determine and/or to enhance certainty, to supplement/complement measurements, and/or to substitute/provide for missing information.

FIG. 5 is a diagram 500 illustrating an example of displacement positioning based on reference signal measurements. The wireless device 502 and the wireless device 506 may be connected to a network entity 508, for example an LMF, via one or more backhaul links. The wireless device 504 may be a UE or a PRU. The wireless device 502 may be a network node, such as a base station or a TRP. The wireless device 506 may be a network node, such as a base station or a TRP. The network entity 508 may configure one or more positioning sessions to calculate a position of the wireless device 504 relative to the wireless device 502 and the wireless device 506. For example, during a first time period, the network entity 508 may configure the wireless device 504 to perform positioning with the wireless device 502 and the wireless device 506, calculating or deriving a position of the wireless device 504 at a first location, shown in the diagram 500 as Fix A. During a second time period, the network entity 508 may configure the wireless device 504 to perform positioning with the wireless device 502 and the wireless device 506, calculating or deriving a position of the wireless device 504 at a second location, shown in the diagram 500 as Fix B.

During the first positioning session (i.e., a first time period) to ascertain Fix A, the wireless device 504 may transmit a set of positioning signals that are received as a set of positioning signals 512 at the wireless device 502 and are received as a set of positioning signals 514 at the wireless device 506. The positioning signals may be, for example, SRSs or CSI-RSs. During the second positioning session (e., a second time period) to ascertain Fix B, the wireless device 504 may transmit a set of positioning signals that are received as a set of positioning signals 516 at the wireless device 502 and are received as a set of positioning signals 518 at the wireless device 506. In some aspects, a positioning entity, such as the network entity 508, the wireless device 502, the wireless device 504, or the wireless device 506, calculating the position/location of the wireless device 504 may perform a full set of calculations at Fix A to derive $(x_A, y_A)$ and a full set of calculations at Fix B to derive $(x_B, y_B)$. In other aspects, the positioning entity may perform a full set of calculations at Fix A to calculate the position/location of the wireless device 504, but may only calculate an offset of the position of the wireless device 504 from Fix A at Fix B in order to reduce the cost of calculating the position/location of the wireless device 504. If the positioning entity knows the location of the wireless device 504 at Fix A and the offset $(\Delta x_{AB}, \Delta y_{AB})$ of Fix B from Fix A, then the positioning entity may calculate the location of the wireless device 504 without performing a full set of calculations.

In some aspects, the positioning entity may calculate a displacement of the wireless device 504 from the first location at Fix A and the second location at Fix B based on RFFP measurements taken of the sets of SRSs from the wireless device 504. Positioning displacement of a wireless device may be calculated as a difference in metrics between two fixes, for example a difference in positioning along an x-axis and a difference in positioning along a y-axis. In three-dimensional space, positioning displacement may be calculated as a difference in positioning along an x-axis, a y-axis, and a z-axis. In some aspects, a positioning entity may bootstrap displacement measurements with other ground truth positions, such as known positions of TRPs or known positions of PRUs, to improve positioning calculations. In some aspects, a positioning entity may perform a dead reckoning calculation on the wireless device 504 to determine the position of the wireless device 504 at Fix B $(x_B, y_B)$ by adding a measured displacement $(\Delta x_{AB}, \Delta y_{AB})$ to a positioning of the wireless device 504 at Fix A $(x_A, y_A)$. In some aspects, the positioning entity may integrate displacement measurements within an outer loop for filtering, prediction, and smoothing of positioning estimates for the wireless device 504.

While the wireless device 504 may measure its displacement at Fix B relative to Fix A using sensors (e.g., inertial measurement units (IMUs)), such sensors may have noisy sensor outputs (e.g., if a UE is carried by a moving person or is in a bag that jostles around). Moreover, some wireless devices may have antennas, but may not have sensors such as IMUs that may accurately calculate displacement of the wireless device from one position to another position. It may be beneficial to calculate the position and/or the location of the wireless device 504 based on RF positioning signals to measure displacement of the wireless device 504 from its position at Fix A to its position at Fix B. In some aspects, a network may be configured to use a positioning model to calculate a position of a wireless device, such as the wireless device 504. The positioning model may be trained to calculate a displacement of the wireless device 504 based on training data, such as a set of inputs to the positioning model and a set of outputs to the positioning model. In some aspects, devices in a wireless RF positioning system may be configured to signal and report data with one another for training a positioning model, and/or for feeding inputs to a positioning model to calculate outputs that may be used to calculate a displacement of the wireless device 504. In some aspects, network nodes, such as the wireless device 502 and/or the wireless device 504, may be configured with a set of specifications (e.g., NR positioning protocol (NRPP)

annex (NRPPa)) that allows the network node to transmit appropriate measurements (e.g., a composition of RFFPs captured at two different time instances at two different positions) for calculating displacement positioning at a network device, such as the network entity 508. In some aspects, network nodes, such as the wireless device 502 and/or the wireless device 504, may be configured with a set of specifications (e.g., based on NRPPa) for reporting displacement information to a network device, such as the network entity 508.

FIG. 6 is a diagram 600 illustrating an example of positioning model training based on an offline database of known RFFP measurements and positions. An offline device 602 may be used to train a positioning model, and an online device 608 may be used to utilize the positioning model. An offline device may be a device that is not connected to a network node or a UE during positioning, and may be part of a core network, such as the core network 120 in FIG. 1. In some aspects, the offline device 602 may be an over-the-top (OTT) server and the online device 608 may be a location management server (LMF). An online device may be a device that is connected to a network node or a UE during positioning, and may be a wireless device that is used to perform positioning, such as a network node that receives a set of SRSs from a UE, or a network entity that receives a set of RFFP measurements associated with one or more sets of SRSs from such a network node. The RFFP measurements may include, for example, a CIR, a CFR, or an RSSI of a set of SRSs transmitted from a wireless device. The offline device 602 may have a database 604 of known RFFP measurements and positions, for example measurements of sets of SRSs from wireless devices transmitting the sets of SRSs from various positions. For example, the database 604 may have a set of RFFPs from wireless devices transmitting sets of SRSs at a set of base stations or TRPs from 1 to N. The wireless devices may transmit the sets of SRSs from a set of positions from 1 to L, which may then be measured to generate the RFFP measurements. The RFFP measurements and known positions of the transmitting wireless devices may be used to train a positioning model 606. For example, the RFFP measurements may be inputs to the positioning model and the positions of the wireless devices, or intermediate measurements that may be used to calculate a position of a wireless device, may be expected labels for the positioning model. The positioning model 606 may include a neural network. In some aspects, the database 604 may include channel measurements of positioning signals, such as features and ground truth locations of wireless devices. In some aspects, the database 604 may include TDoA measurements and/or ToA measurements, which may be used to calculate a location. In some aspects, the database 604 may include labels for training a positioning model. The labels may be associated with known locations of wireless devices generating training data for a positioning model. The positioning model may be trained using AI/ML techniques. The online device 608 may generate a radio frequency (RF) map 610 that may be used to estimate displacement information related to a movement of a wireless device based on a set of RFFP measurements from a plurality of base stations measuring sets of SRSs. For example, the RF map 610 may accept an input of a first set of RFFPs to a set of base stations 1 to N from a wireless device transmitting a set of SRSs from a first position O, and a second set of RFFPs to the set of base stations from 1 to N from the wireless device transmitting a set of SRSs from a second position P. The RF map may then calculate displacement information between the two positions O and P as the position vector V. This may be used to calculate the new position P of the wireless device given the old position O of the wireless device.

The positioning model 606 may have an input of a set of displacement RFFP measurements constructed by prepressing a first measurement of a first set of positioning signals transmitted from a first position during a first time period and a second measurement of a second set of positioning signals transmitted from a second position during a second time period. The output may be the calculated displacement information between the first position and the second position. The first measurement may correspond with the first set of positioning signals measured at a first set of TRPs and the second measurement may correspond with the second set of positioning signals measured at a second set of TRPs. The TRPs may report the set of displacement RFFP measurements to a location server, such as the network entity 508 in FIG. 5, for inference of the displacement information using a positioning model, or one network node may aggregate the set of displacement RFFP measurements for inference of the displacement information using a positioning model. The first set of TRPs and the second set of TRPs may be the same.

Referring back to FIG. 5, in some aspects, a network node, such as the wireless device 502 or the wireless device 506, may perform displacement positioning of the wireless device 504 from its position at Fix A to its position at Fix B using a positioning model. For example, the wireless device 502 may measure the set of positioning signals 512 at Fix A and the set of positioning signals 516 at Fix B, and may process the measurements using a positioning model to calculate displacement information of the wireless device 504 from Fix A to Fix B (e.g., $\Delta x_{AB}$, $\Delta y_{AB}$), and may transmit that displacement information to the network entity 508, for example via NRPPa signaling. In another example, the wireless device 506 may measure the set of positioning signals 514 at Fix A and the set of positioning signals 518 at Fix B, and may process the measurements using a positioning model to calculate displacement information of the wireless device 504 from Fix A to Fix B, and may transmit that displacement information to the network entity 508. In another example, one of the wireless devices 502 or 506 may receive measurements from the other wireless device, and may process the aggregated or collected measurements using a positioning model to calculate displacement information of the wireless device 504 from Fix A to Fix B, and may transmit that displacement information to the network entity 508.

In some aspects, a network node, such as the wireless device 502 or the wireless device 506, may assist the network entity 508 in performing displacement positioning of the wireless device 504 from its position at Fix A to its position at Fix B using a positioning model. For example, the wireless device 502 may calculate a first displacement RFFP (e.g., a sum of the measurements of the set of positioning signals 512 at Fix A and the set of positioning signals 516 at Fix B) and may transmit the calculated first displacement RFFP to the network entity 508. Similarly, the wireless device 506 may calculate a second displacement RFFP (e.g., a sum of the measurements of the set of positioning signals 514 at Fix A and the set of positioning signals 518 at Fix B) and may transmit the calculated second displacement RFFP to the network entity 508. The network entity 508 may then use a positioning model to calculate the displacement (e.g., $\Delta x_{AB}$, $\Delta y_{AB}$) of the wireless device 504 from Fix A to Fix B. In some aspects one network node of a set of network nodes may aggregate the measurements such that the network entity 508 receives a set of displacement RFFP measurements from a single network node instead of a set of network nodes. In some aspects, a network entity, such as the network entity 508, may perform displacement positioning of the wireless device 504 from its position at Fix A to its position at Fix B using a positioning model.

In some examples, by calculating a set of displacement information based on a set of displacement RFFP measurements taken at a network node, a position/location of a wireless device, such as a UE, may be calculated using less energy to perform RF positioning and tracking. Such a system may employ hybrid displacement-full positioning by performing full positioning at a first position and displacement positioning at a second location after performing full positioning at the first position. Less resources may be used as displacement information may be reported instead of measurements for each positioning occasion (e.g., the first full positioning occasion and the second displacement positioning occasion). In some aspects, wireless devices may be configured to generate training data for positioning models that bootstrap different positioning label types (e.g., displacement information, anchor information) to improve efficiency and/or accuracy. Accurate positioning may be calculated using a positioning model by calculating displacement information without use of resource-intensive sensors at the wireless device. In some aspects, sensor outputs may be enhanced by fusing displacement information calculated based on RFFP displacement measurements with sensor outputs. The displacement information may also be used to train other positioning models.

In some aspects, the network entity 508 may communicate with a set of network nodes, such as the wireless device 502 and/or the wireless device 506, to infer target displacement information of the wireless device 504 using a positioning model. The communication may be configured as a part of NRPPa signaling between the network entity 508 and the wireless device 502 and/or the wireless device 506.

In one example, the network entity 508 may transmit a request to the wireless device 502 and/or the wireless device 506 to indicate support to perform displacement positioning based on a positioning model, or to report intermediate information/measurements that the network entity 508 may use to calculate displacement information. For example, the wireless device 502 may indicate its support to report SRS-based intermediate quantities (e.g., a timing measurement, an angle measurement, a line-of-sight (LOS) identification) that may be used by the network entity 508 to calculate displacement information of the wireless device 504. In another example, the wireless device 502 may indicate its support to conduct SRS-based displacement positioning using a positioning model and report its calculated result back to the network entity 508.

In response to a wireless device indicating its support, the network entity 508 may configure one or more displacement positioning sessions (or assisted displacement positioning sessions) for the set of network nodes. In some aspects, the network entity 508 may include a time resolution between resources considered for displacement positioning and/or a periodicity between positioning sessions. In some aspects, the network entity 508 may include a configuration for a network node to adapt a time resolution between resources included for positioning to account for a speed of the wireless device 504. For example, the wireless device 502 may monitor a target speed of the wireless device 504 based on Doppler measurements, and may, according to a configuration from the network entity 508, adapt the resource occasions, measurements, and reporting for a plurality of positioning occasions based on the calculated target speed of the wireless device 504.

The configured displacement positioning sessions may include at least one full positioning session, for example at Fix A, and at least one displacement positioning session, for example at Fix B. During each of the positioning sessions, the wireless device 504 may be configured to transmit a set of positioning signals at a plurality of network nodes. One or more of the set of network nodes may receive and measure positioning signals transmitted by the wireless device 504 at two different time periods from two different positions, such as the set of positioning signals 512 and the set of positioning signals 514 transmitted by the wireless device 504 at Fix A during a first time period and the set of positioning signals 516 and the set of positioning signals 518 transmitted by the wireless device 504 at Fix B during a second time period. In one aspect, the set of network nodes may report the displacement RFFP measurements to the network entity 508, and the network entity 508 may leverage the reported displacement RFFP measurements to infer displacement information of the wireless device 504 from Fix A to Fix B, for example by using a positioning model. The reported displacement RFFP measurements may include a composition of RFFP measurements obtained during two different timing instants, for example a sum of an RFFP calculated at Fix A and an RFFP calculated at Fix B. This may provide a reduction in reporting overhead as opposed to providing both RFFP measurements separately. The composition may be a composition of CIR, a composition of CFR, a composition of RSRQ, a composition of RSRP, a composition of delay spread, a composition of angle spread, a composition of AoA angles, a composition of AoD angles, and/or a composition of Doppler spread. The combinations may be received and measured at one antenna port, or at multiple antenna ports of a network node. In another aspect, one of the set of network nodes (e.g., wireless device 502) may conduct an inference of displacement information based on a positioning model, and may report the calculated displacement information to the network entity 508.

Figure 7:
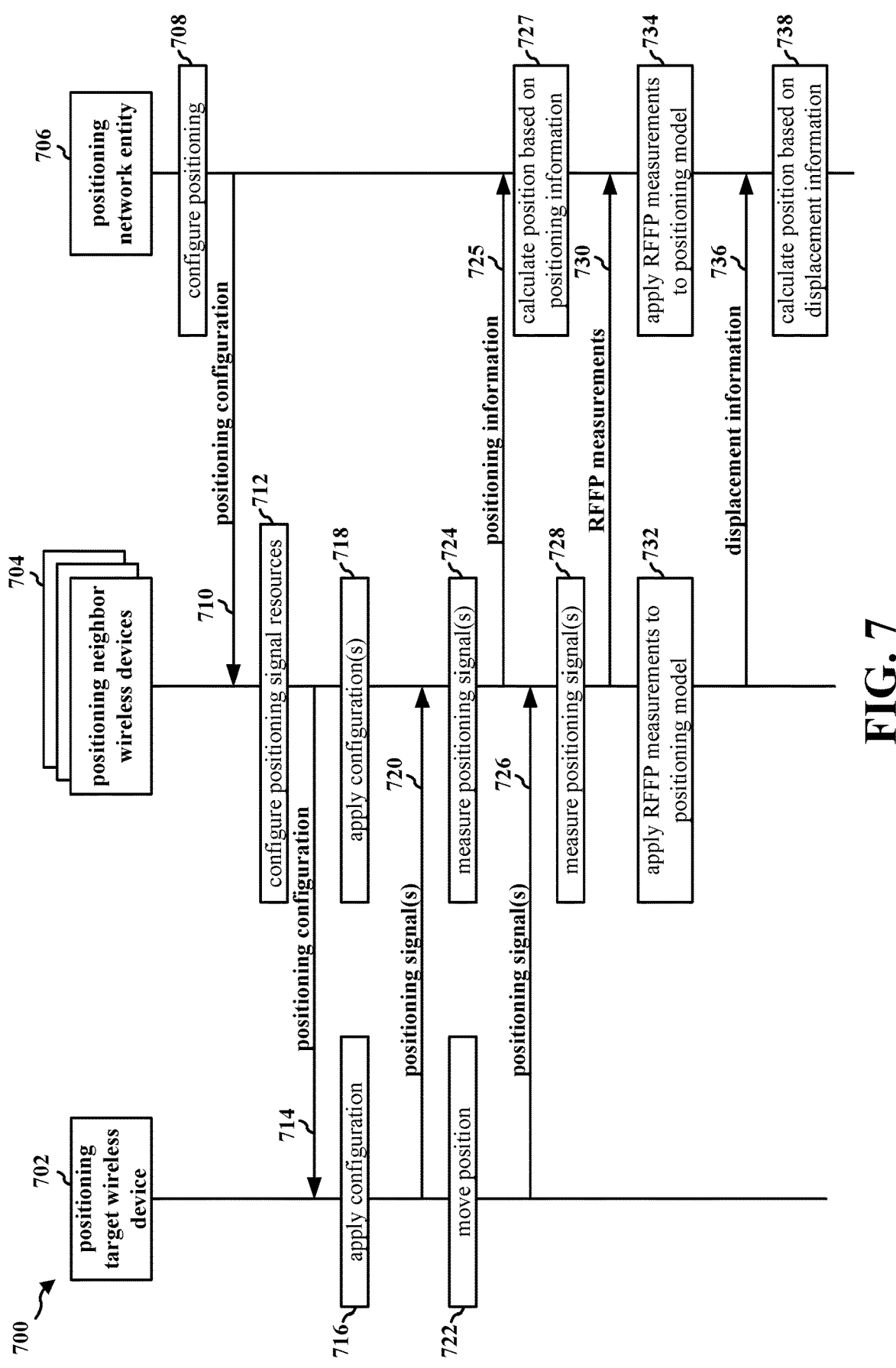
FIG. 7 is a connection flow diagram illustrating a set of positioning neighbor wireless devices and a positioning network entity configured to calculate a position of a positioning target wireless device using a positioning model.

FIG. 7 is a connection flow diagram 700 illustrating a set of positioning neighbor wireless devices 704 and a positioning network entity 706 configured to calculate a position of a positioning target wireless device 702 using a positioning model. In some aspects, at least one of the set of positioning neighbor wireless devices 704 may calculate displacement information of the positioning target wireless device 702 based on measurements of positioning signals (e.g., SRSs, CSI-RSs) transmitted from the positioning target wireless device 702. In some aspects, the positioning network entity 706 may calculate displacement information of the positioning target wireless device 702 based on measurements of positioning signals transmitted from the positioning target wireless device 702.

At 708, the positioning network entity 706 may configure positioning. The positioning network entity 706 may transmit the positioning configuration 710 to the set of positioning neighbor wireless devices 704. The set of positioning neighbor wireless devices 704 may receive the positioning configuration 710 from the positioning network entity 706. At 712, the set of positioning neighbor wireless devices 704 may configure positioning signal resources based on the positioning configuration 710. At least one of the set of positioning neighbor wireless devices 704 may transmit a positioning configuration 714 to the positioning target wireless device 702. The positioning target wireless device 702 may receive the positioning configuration 714. A network node serving the positioning target wireless device 702 may transmit the positioning configuration 714 to the positioning target wireless device 702. The positioning configuration 714 may configure sets of SRSs to be transmitted by the positioning target wireless device 702 and to be received and measured by the set of positioning neighbor wireless devices 704. At 716, the positioning target wireless device 702 may configure positioning signal resources to transmit the set of positioning signals 720 at the set of positioning neighbor wireless devices 704. The set of positioning signals 720 may include a set of SRSs and/or a set of CSI-RSs. At 718, the set of positioning neighbor wireless devices 704 may configure a set of positioning signal resources to receive and measure the set of positioning signals 720. The positioning target wireless device 702 may transmit the set of positioning signals 720 during a first time period when the positioning target wireless device 702 is at a first position.

At 724, the set of positioning neighbor wireless devices 704 may measure the set of positioning signals 720. The set of positioning neighbor wireless devices 704 may calculate one or more RFFP measurements based on the measurements. The RFFP measurements may include at least one of (a) a channel impulse response (CIR), (b) a channel frequency response (CFR), (c) a histogram of a reference signal strength indicator (RSSI), (d) a reference signal received power (RSRP), (e) a reference signal received quality (RSRQ), (f) an angle of arrival (AoA), (g) an angle of departure (AoD), (h) a delay spread, (i) an angle spread, and/or (j) a Doppler spread. In some aspects, the set of positioning neighbor wireless devices 704 may calculate traditional positioning measurements, such as RTT information between a PRS transmitted by one of the set of positioning neighbor wireless devices 704 and an SRS transmitted in response from the positioning target wireless device 702, or a TDOA. The set of positioning neighbor wireless devices 704 may transmit a set of positioning information 725 to the positioning network entity 706. At 727, the positioning network entity 706 may perform a full positioning on the positioning target wireless device 702 based on positioning information that it receives. The positioning network entity 706 may also receive positioning information from other wireless devices, such as measurements of positioning signals received and measured by the positioning target wireless device 702 that were transmitted by the set of positioning neighbor wireless devices 704, or measurements by other network nodes of other positioning signals transmitted by the positioning target wireless device 702 to the other network nodes. The positioning network entity 706 may calculate the location and/or position of the positioning target wireless device 702 at 727 based on a classic RF positioning calculation without using a positioning model that calculates displacement information.

At 722, the positioning target wireless device 702 may move its position to a second position. The positioning target wireless device 702 may then transmit the set of positioning signals 726 at the set of positioning neighbor wireless devices 704. The set of positioning neighbor wireless devices 704 may receive the set of positioning signals 726. The set of positioning signals 726 may include a set of SRSs and/or a set of CSI-RSs. In some aspects, the positioning configuration 714 may configure the set of positioning signals 726. In other aspects, the positioning network entity 706 and/or the set of positioning neighbor wireless devices 704 may configure the set of positioning signals 726 separately from the set of positioning signals 720. The positioning target wireless device 702 may transmit the set of positioning signals 726 during a second time period, non-overlapping with the first time period, when the positioning target wireless device 702 is at a second position different from the first position.

At 728, the set of positioning neighbor wireless devices 704 may measure the set of positioning signals 726. The set of positioning neighbor wireless devices 704 may calculate one or more RFFP measurements based on the measurements. The RFFP measurements may include at least one of (a) a CIR, (b) a CFR, (c) a histogram of an RSSI, (d) an RSRP, (e) an RSRQ, (f) an AoA, (g) an AoD, (h) a delay spread, (i) an angle spread, and/or (j) a Doppler spread. The displacement RFFP measurements may include a composition of the aforementioned RFFP measurement types measured at 724 and measured at 728. For example, a displacement RFFP measurement may be a sum of CIRs from the set of positioning signals 720 and the set of positioning signals 726. In another example, a displacement RFFP measurement may be an average of the histogram of an RSSI of the set of positioning signals 720 and the set of positioning signals 726.

In some aspects, at least one of the set of positioning neighbor wireless devices 704 may apply at least some of the RFFP measurements to calculate displacement information of the positioning target wireless device 702 from the first position to the second position (i.e., how much the positioning target wireless device 702 moved at 722). At 732, at least one of the set of positioning neighbor wireless devices 704 may apply at least some of the RFFP measurements taken at 728 and/or 724 to calculate displacement information associated with the positioning target wireless device 702. The at least one of the set of positioning neighbor wireless devices 704 may transmit the set of displacement information 736 to the positioning network entity 706. The positioning network entity 706 may receive the set of displacement information 736 from the at least one of the set of positioning neighbor wireless devices 704. At 738, the positioning network entity 706 may calculate a position of the positioning target wireless device 702 based on the set of displacement information 736. For example, the positioning network entity 706 may first calculate a location of the positioning target wireless device 702 based on a positioning of the positioning target wireless device 702 at the first position (e.g., the positioning configuration 710 may configure a set of positioning signals to be exchanged between the target positioning wireless device 702 and the set of positioning neighbor wireless devices 704 during a first time period, such as a set of SRSs and a set of PRSs). The positioning network entity 706 may then calculate the second location of the positioning target wireless device 702 based on the first calculated location and the set of displacement information 736.

In some aspects, the positioning network entity 706 may apply at least some of the RFFP measurements to a positioning model to calculate displacement information of the positioning target wireless device 702 from the first position to the second position. At least one of the set of positioning neighbor wireless devices 704 may transmit the set of RFFP measurements 730 to the positioning network entity 706. The positioning network entity 706 may receive the set of RFFP measurements 730 from the at least one of the set of positioning neighbor wireless devices 704. At 734, the positioning network entity 706 may apply at least some of the set of RFFP measurements 730 to calculate displacement information associated with the positioning target wireless device 702. At 738, the positioning network entity 706 may calculate a position of the positioning target wireless device

702 based on the displacement information calculated at 734. For example, the positioning network entity 706 may first calculate a location of the positioning target wireless device 702 based on a positioning of the positioning target wireless device 702 at the first position (e.g., at 727). The positioning network entity 706 may then calculate the second location of the positioning target wireless device 702 based on the first calculated location and the displacement information calculated at 734. The calculation at 738 may use less resources than the calculation at 727, for example fewer computing resources or less measurements. For example, the calculation at 727 may use measurements taken at both the positioning target wireless device 702 and the set of positioning neighbor wireless devices 704, whereas the calculation at 738 may use RFFP displacement measurements taken at the set of positioning neighbor wireless devices 704.

FIG. 8 is a flowchart 800 of a method of wireless communication. The method may be performed by a first network node (e.g., the base station 102, the base station 310; the LMF 166; the one or more location servers 168; the wireless device 402, the wireless device 406, the wireless device 502, the wireless device 506; the network entity 508; the online device 608; the set of positioning neighbor wireless devices 704; the positioning network entity 706; the network entity 1302, the network entity 1460). At 802, the first network node may receive a first set of SRSs and a second set of SRSs from a wireless device. For example, 802 may be performed by the set of positioning neighbor wireless devices 704, which may receive the set of positioning signals 720 and the set of positioning signals 726 from the positioning target wireless device 702. The set of positioning signals 720 may be a set of SRSs. The set of positioning signals 726 may be a set of SRSs. Moreover, 802 may be performed by the component 198 in FIG. 1, 3, 13, or 14.

At 804, the first network node may measure the first set of SRSs and the second set of SRSs. For example, 804 may be performed by the set of positioning neighbor wireless devices 704, which may, at 724, measure the set of positioning signals 720 and, at 728, measure the set of positioning signals 726. The set of positioning signals 720 may be a set of SRSs. The set of positioning signals 726 may be a set of SRSs. Moreover, 804 may be performed by the component 198 in FIG. 1, 3, 13, or 14.

At 806, the first network node may calculate a set of displacement RFFP measurements based on the measured first set of SRSs and measured second set of SRSs. For example, 806 may be performed by the set of positioning neighbor wireless devices 704, which may, at 724, calculate a set of displacement RFFP measurements based on the measurements of the set of positioning signals 720, and may, at 728, calculate a set of displacement RFFP measurements based on the measurements of the set of positioning signals 726. Moreover, 806 may be performed by the component 198 in FIG. 1, 3, 13, or 14.

At 808, the first network node may output the set of displacement RFFP measurements to a positioning model to calculate a set of displacement information associated with the wireless device. For example, 808 may be performed by the set of positioning neighbor wireless devices 704, which may transmit the set of displacement RFFP measurements as the set of displacement information 736 to the positioning network entity 706 for use on a positioning model to calculate a set of displacement information associated with the positioning target wireless device 702 at 734. In another example, 808 may be performed by the set of positioning neighbor wireless devices 704, which may output the set of displacement RFFP measurements to a positioning model at 732 to calculate a set of displacement information associated with the positioning target wireless device 702. Moreover, 808 may be performed by the component 198 in FIG. 1, 3, 13, or 14.

FIG. 9 is a flowchart 900 of a method of wireless communication. The method may be performed by a first network node (e.g., the base station 102, the base station 310; the LMF 166; the one or more location servers 168; the wireless device 402, the wireless device 406, the wireless device 502, the wireless device 506; the network entity 508; the online device 608; the set of positioning neighbor wireless devices 704; the positioning network entity 706; the network entity 1302, the network entity 1460). At 901, the first network node may receive a request to indicate support for outputting the set of RFFP measurements to the positioning model. For example, 901 may be performed by at least some of the set of positioning neighbor wireless devices 704, which may receive a request from the positioning network entity 706 to indicate its support for outputting the set of RFFP measurements 730 to the positioning network entity 706 for use at the positioning model at 734, or to a locally located positioning model at 732. Moreover, 901 may be performed by the component 198 in FIG. 1, 3, 13, or 14.

At 903, the first network node may transmit an indication of support to output the set of displacement RFFP measurements. For example, 903 may be performed by at least some of the set of positioning neighbor wireless devices 704, which may transmit, to the positioning network entity 706, an indication of support to output the set of displacement RFFP measurements. The transmission of the indication of support may be in response to receiving the request at 901. Moreover, 903 may be performed by the component 198 in FIG. 1, 3, 13, or 14.

At 902, the first network node may receive a first set of SRSs and a second set of SRSs from a wireless device. For example, 902 may be performed by the set of positioning neighbor wireless devices 704, which may receive the set of positioning signals 720 and the set of positioning signals 726 from the positioning target wireless device 702. The set of positioning signals 720 may be a set of SRSs. The set of positioning signals 726 may be a set of SRSs. Moreover, 902 may be performed by the component 198 in FIG. 1, 3, 13, or 14.

At 904, the first network node may measure the first set of SRSs and the second set of SRSs. For example, 904 may be performed by the set of positioning neighbor wireless devices 704, which may, at 724, measure the set of positioning signals 720 and, at 728, measure the set of positioning signals 726. The set of positioning signals 720 may be a set of SRSs. The set of positioning signals 726 may be a set of SRSs. Moreover, 904 may be performed by the component 198 in FIG. 1, 3, 13, or 14.

At 906, the first network node may calculate a set of displacement RFFP measurements based on the measured first set of SRSs and measured second set of SRSs. For example, 906 may be performed by the set of positioning neighbor wireless devices 704, which may, at 724, calculate a set of displacement RFFP measurements based on the measurements of the set of positioning signals 720, and may, at 728, calculate a set of displacement RFFP measurements based on the measurements of the set of positioning signals 726. Moreover, 906 may be performed by the component 198 in FIG. 1, 3, 13, or 14.

At 908, the first network node may output the set of displacement RFFP measurements to a positioning model to calculate a set of displacement information associated with the wireless device. For example, 908 may be performed by the set of positioning neighbor wireless devices 704, which may transmit the set of displacement RFFP measurements as the set of displacement information 736 to the positioning network entity 706 for use on a positioning model to calculate a set of displacement information associated with the positioning target wireless device 702 at 734. In another example, 908 may be performed by the set of positioning neighbor wireless devices 704, which may output the set of displacement RFFP measurements to a positioning model at 732 to calculate a set of displacement information associated with the positioning target wireless device 702. Moreover, 908 may be performed by the component 198 in FIG. 1, 3, 13, or 14.

At 910, the first network node may receive the first set of SRSs during a first time period associated with a first position of the wireless device and receive the second set of SRSs during a second time period associated with a second position of the wireless device, where the second time period may not overlap with the first time period. For example, 910 may be performed by the set of positioning neighbor wireless devices 704, which may receive the set of positioning signals 720 during a first time period associated with a first position of the positioning target wireless device 702 and receive the set of positioning signals 726 during a second time period associated with a second position of the positioning target wireless device 702. The second time period may not overlap with the first time period. Moreover, 910 may be performed by the component 198 in FIG. 1, 3, 13, or 14.

At 912, the first network node may calculate the set of displacement information using the positioning model based on the set of displacement RFFP measurements. For example, 912 may be performed by the set of positioning neighbor wireless devices 704, which may, at 732, calculate the set of displacement information using the positioning model based on the set of displacement RFFP measurements measured at 728 and/or 724. Moreover, 912 may be performed by the component 198 in FIG. 1, 3, 13, or 14.

At 914, the first network node may calculate the second position based on the first position and the set of displacement information. For example, 914 may be performed by the set of positioning neighbor wireless devices 704, which may, at 732, calculate the second position of the positioning target wireless device 702 based on the first position of the positioning target wireless device 702 and the set of displacement information measured at 728. Moreover, 914 may be performed by the component 198 in FIG. 1, 3, 13, or 14.

At 916, the first network node may transmit the set of displacement RFFP measurements to a second network node to calculate the set of displacement information using the positioning model. For example, 916 may be performed by the set of positioning neighbor wireless devices 704, which may transmit the set of RFFP measurements 730 to the positioning network entity 706 to calculate the set of displacement information using the positioning model at 734. Moreover, 916 may be performed by the component 198 in FIG. 1, 3, 13, or 14.

Figure 10:
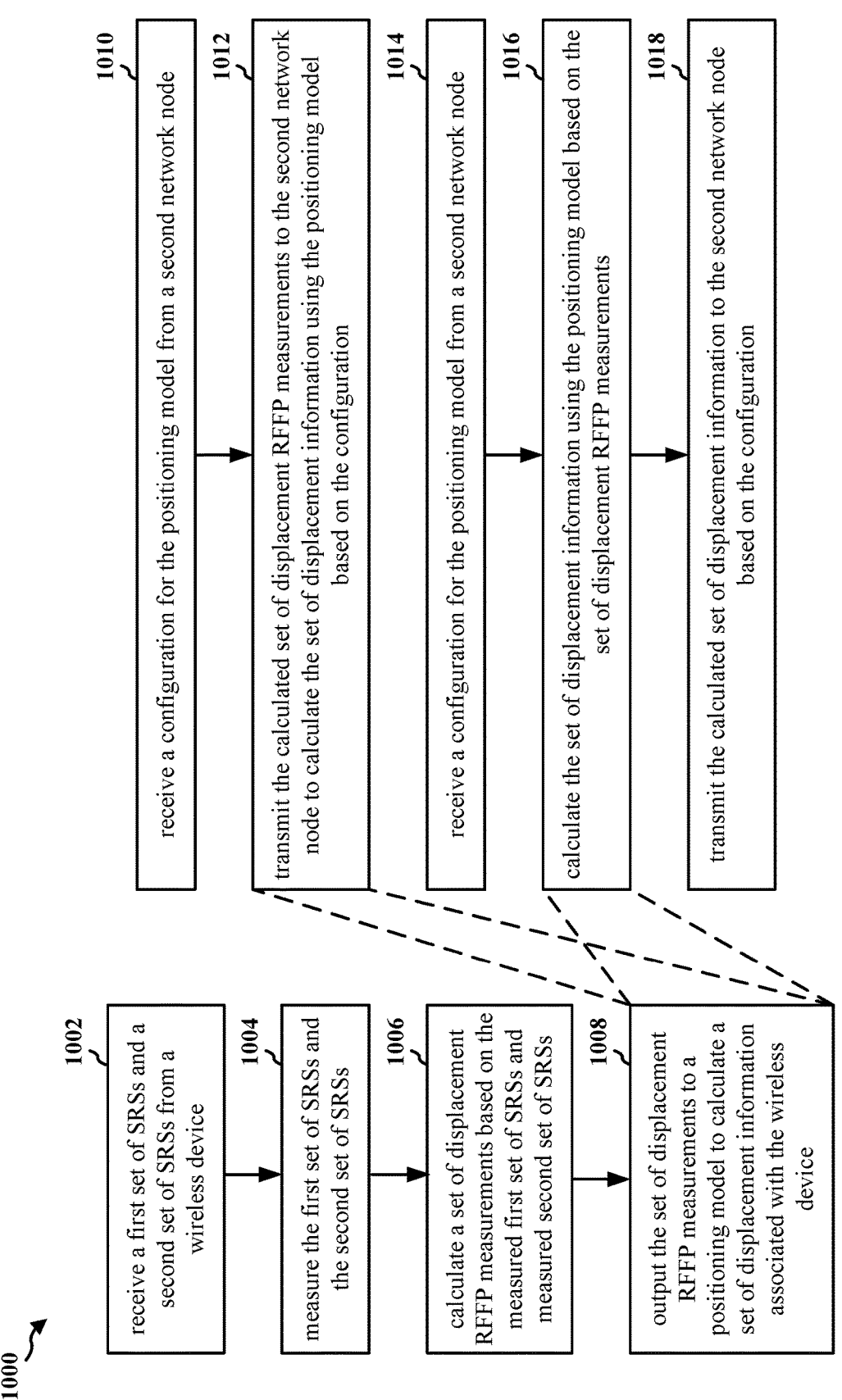
FIG. 10 is a flowchart of a method of wireless communication.

FIG. 10 is a flowchart 1000 of a method of wireless communication. The method may be performed by a first network node (e.g., the base station 102, the base station 310; the LMF 166; the one or more location servers 168; the wireless device 402, the wireless device 406, the wireless device 502, the wireless device 506; the network entity 508; the online device 608; the set of positioning neighbor wireless devices 704; the positioning network entity 706; the network entity 1302, the network entity 1460). At 1002, the first network node may receive a first set of SRSs and a second set of SRSs from a wireless device. For example, 1002 may be performed by the set of positioning neighbor wireless devices 704, which may receive the set of positioning signals 720 and the set of positioning signals 726 from the positioning target wireless device 702. The set of positioning signals 720 may be a set of SRSs. The set of positioning signals 726 may be a set of SRSs. Moreover, 1002 may be performed by the component 198 in FIG. 1, 3, 13, or 14.

At 1004, the first network node may measure the first set of SRSs and the second set of SRSs. For example, 1004 may be performed by the set of positioning neighbor wireless devices 704, which may, at 724, measure the set of positioning signals 720 and, at 728, measure the set of positioning signals 726. The set of positioning signals 720 may be a set of SRSs. The set of positioning signals 726 may be a set of SRSs. Moreover, 1004 may be performed by the component 198 in FIG. 1, 3, 13, or 14.

At 1006, the first network node may calculate a set of displacement RFFP measurements based on the measured first set of SRSs and measured second set of SRSs. For example, 1006 may be performed by the set of positioning neighbor wireless devices 704, which may, at 724, calculate a set of displacement RFFP measurements based on the measurements of the set of positioning signals 720, and may, at 728, calculate a set of displacement RFFP measurements based on the measurements of the set of positioning signals 726. Moreover, 1006 may be performed by the component 198 in FIG. 1, 3, 13, or 14.

At 1008, the first network node may output the set of displacement RFFP measurements to a positioning model to calculate a set of displacement information associated with the wireless device. For example, 1008 may be performed by the set of positioning neighbor wireless devices 704, which may transmit the set of displacement RFFP measurements as the set of displacement information 736 to the positioning network entity 706 for use on a positioning model to calculate a set of displacement information associated with the positioning target wireless device 702 at 734. In another example, 1008 may be performed by the set of positioning neighbor wireless devices 704, which may output the set of displacement RFFP measurements to a positioning model at 732 to calculate a set of displacement information associated with the positioning target wireless device 702. Moreover, 1008 may be performed by the component 198 in FIG. 1, 3, 13, or 14.

At 1010, the first network node may receive a configuration for the positioning model from a second network node. For example, 1010 may be performed by at least one of the set of positioning neighbor wireless devices 704, which may receive the positioning configuration 710 for the positioning model from the positioning network entity 706. Moreover, 1010 may be performed by the component 198 in FIG. 1, 3, 13, or 14.

At 1012, the first network node may transmit the calculated set of displacement RFFP measurements to the second network node to calculate the set of displacement information using the positioning model based on the configuration. For example, 1012 may be performed by at least one of the set of positioning neighbor wireless devices 704, which may transmit the set of RFFP measurements 730 to the positioning network entity 706 to, at 734, calculate the set of displacement information using the positioning model based on the configuration. Moreover, 1012 may be performed by the component 198 in FIG. 1, 3, 13, or 14.

At 1014, the first network node may receive a configuration for the positioning model from a second network node. For example, 1014 may be performed by at least one of the set of positioning neighbor wireless devices 704, which may receive the positioning configuration 710 configuration for the positioning model from the positioning network entity 706. Moreover, 1014 may be performed by the component 198 in FIG. 1, 3, 13, or 14.

At 1016, the first network node may calculate the set of displacement information using the positioning model based on the set of displacement RFFP measurements. For example, 1016 may be performed by at least one of the set of positioning neighbor wireless devices 704, which may, at 732, calculate the set of displacement information using the positioning model based on the set of displacement RFFP measurements taken at 728 and/or at 724. Moreover, 1016 may be performed by the component 198 in FIG. 1, 3, 13, or 14.

At 1018, the first network node may transmit the calculated set of displacement information to the second network node based on the configuration. For example, 1018 may be performed by at least one of the set of positioning neighbor wireless devices 704, which may transmit the set of displacement information 736 to the positioning network entity 706 based on the positioning configuration 710. For example, the positioning configuration 710 may indicate to at least one of the set of positioning neighbor wireless devices 704 to periodically transmit calculated displacement information according to a schedule. Moreover, 1018 may be performed by the component 198 in FIG. 1, 3, 13, or 14.

FIG. 11 is a flowchart 1100 of a method of wireless communication. The method may be performed by a second network node (e.g., the base station 102, the base station 310; the LMF 166; the one or more location servers 168; the wireless device 402, the wireless device 406, the wireless device 502, the wireless device 506; the network entity 508; the online device 608; the set of positioning neighbor wireless devices 704; the positioning network entity 706; the network entity 1302, the network entity 1460). At 1102, the second network node may transmit a configuration for a positioning model associated with a first set of SRSs and a second set of SRSs to a first network node. For example, 1102 may be performed by the positioning network entity 706, which may transmit the positioning configuration 710 for a positioning model associated with the set of positioning signals 720 and the set of positioning signals 726 to at least one of the set of positioning neighbor wireless devices 704. Moreover, 1102 may be performed by the component 199 in FIG. 1, 3, 13, or 14.

At 1104, the second network node may receive a set of displacement RFFP measurements for the positioning model based on the first set of SRSs and the second set of SRSs. For example, 1104 may be performed by the positioning network entity 706, which may receive a set of RFFP measurements 730 for the positioning model based on the set of positioning signals 720 and the set of positioning signals 726. The set of RFFP measurements 730 may indicate a displacement of the positioning target wireless device 702 from one position when the positioning target wireless device 702 transmitted the set of positioning signals 720 to another position when the positioning target wireless device 702 transmitted the set of positioning signals 726. Moreover, 1104 may be performed by the component 199 in FIG. 1, 3, 13, or 14.

At 1106, the second network node may receive a set of displacement information calculated using the positioning model based on the set of RFFP measurements and the configuration. For example, 1106 may be performed by the positioning network entity 706, which may receive the set of displacement information 736 calculated using the positioning model based on the set of RFFP measurements and the configuration. Moreover, 1106 may be performed by the component 199 in FIG. 1, 3, 13, or 14.

Figure 12:
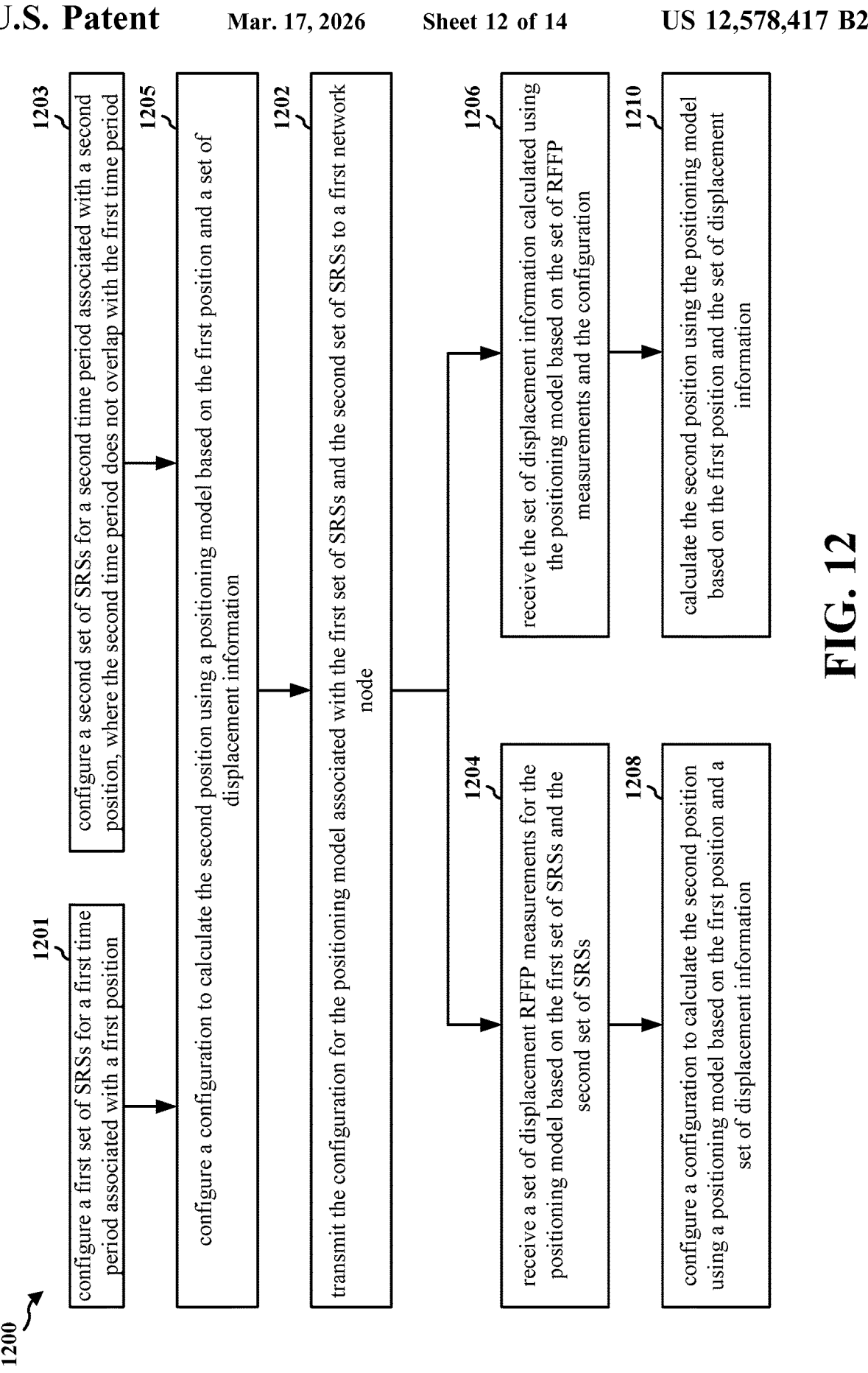
FIG. 12 is a flowchart of a method of wireless communication.

FIG. 12 is a flowchart 1200 of a method of wireless communication. The method may be performed by a second network node (e.g., the base station 102, the base station 310; the LMF 166; the one or more location servers 168; the wireless device 402, the wireless device 406, the wireless device 502, the wireless device 506; the network entity 508; the online device 608; the set of positioning neighbor wireless devices 704; the positioning network entity 706; the network entity 1302, the network entity 1460). At 1201, the second network node may configure a first set of SRSs for a first time period associated with a first position. For example, 1201 may be performed by the positioning network entity 706, which may configure the set of positioning signals 720 for a first time period associated with a first position of the positioning target wireless device 702. Moreover, 1201 may be performed by the component 199 in FIG. 1, 3, 13, or 14.

At 1203, the second network node may configure a second set of SRSs for a second time period associated with a second position, where the second time period does not overlap with the first time period. For example, 1203 may be performed by the positioning network entity 706, which may configure the set of positioning signals 726 for a second time period associated with a second position of the positioning target wireless device 702. The second time period may not overlap with the first time period. Moreover, 1203 may be performed by the component 199 in FIG. 1, 3, 13, or 14.

At 1205, the second network node may configure a configuration to calculate the second position using a positioning model based on the first position and a set of displacement information. For example, 1205 may be performed by the positioning network entity 706, which may, at 708, configure the positioning configuration 710 to calculate the second position of the positioning target wireless device 702 using a positioning model based on the first position of the positioning target wireless device 702 and a set of displacement information (e.g., calculated at 732 or at 734). Moreover, 1205 may be performed by the component 199 in FIG. 1, 3, 13, or 14.

At 1202, the second network node may transmit a configuration for a positioning model associated with a first set of SRSs and a second set of SRSs to a first network node. For example, 1202 may be performed by the positioning network entity 706, which may transmit the positioning configuration 710 for a positioning model associated with the set of positioning signals 720 and the set of positioning signals 726 to at least one of the set of positioning neighbor wireless devices 704. Moreover, 1202 may be performed by the component 199 in FIG. 1, 3, 13, or 14.

At 1204, the second network node may receive a set of displacement RFFP measurements for the positioning model based on the first set of SRSs and the second set of SRSs. For example, 1204 may be performed by the positioning network entity 706, which may receive a set of RFFP measurements 730 for the positioning model based on the set of positioning signals 720 and the set of positioning signals 726. The set of RFFP measurements 730 may indicate a displacement of the positioning target wireless device 702 from one position when the positioning target wireless device 702 transmitted the set of positioning signals 720 to another position when the positioning target wireless device

702 transmitted the set of positioning signals 726. Moreover, 1204 may be performed by the component 199 in FIG. 1, 3, 13, or 14.

At 1206, the second network node may receive a set of displacement information calculated using the positioning model based on the set of RFFP measurements and the configuration. For example, 1206 may be performed by the positioning network entity 706, which may receive the set of displacement information 736 calculated using the positioning model based on the set of RFFP measurements and the configuration. Moreover, 1206 may be performed by the component 199 in FIG. 1, 3, 13, or 14.

At 1208, the second network node may configure a configuration to calculate the second position using a positioning model based on the first position and a set of displacement information. For example, 1208 may be performed by the positioning network entity 706, which may configure the positioning configuration 710 for at least one of the positioning neighbor wireless devices 704 to calculate the second position of the positioning target wireless device 702, or displacement information of the positioning target wireless device 702, using a positioning model based on the first position of the positioning target wireless device 702 and a set of displacement information. Moreover, 1208 may be performed by the component 199 in FIG. 1, 3, 13, or 14.

At 1210, the second network node may calculate the second position using the positioning model based on the first position and the set of displacement information. For example, 1210 may be performed by the positioning network entity 706, which may, at 738, calculate the second position of the positioning target wireless device 702 using the positioning model based on the first position of the positioning target wireless device 702 and the set of displacement information calculated at 734 or received as the set of displacement information 736. Moreover, 1210 may be performed by the component 199 in FIG. 1, 3, 13, or 14.

Figure 13:
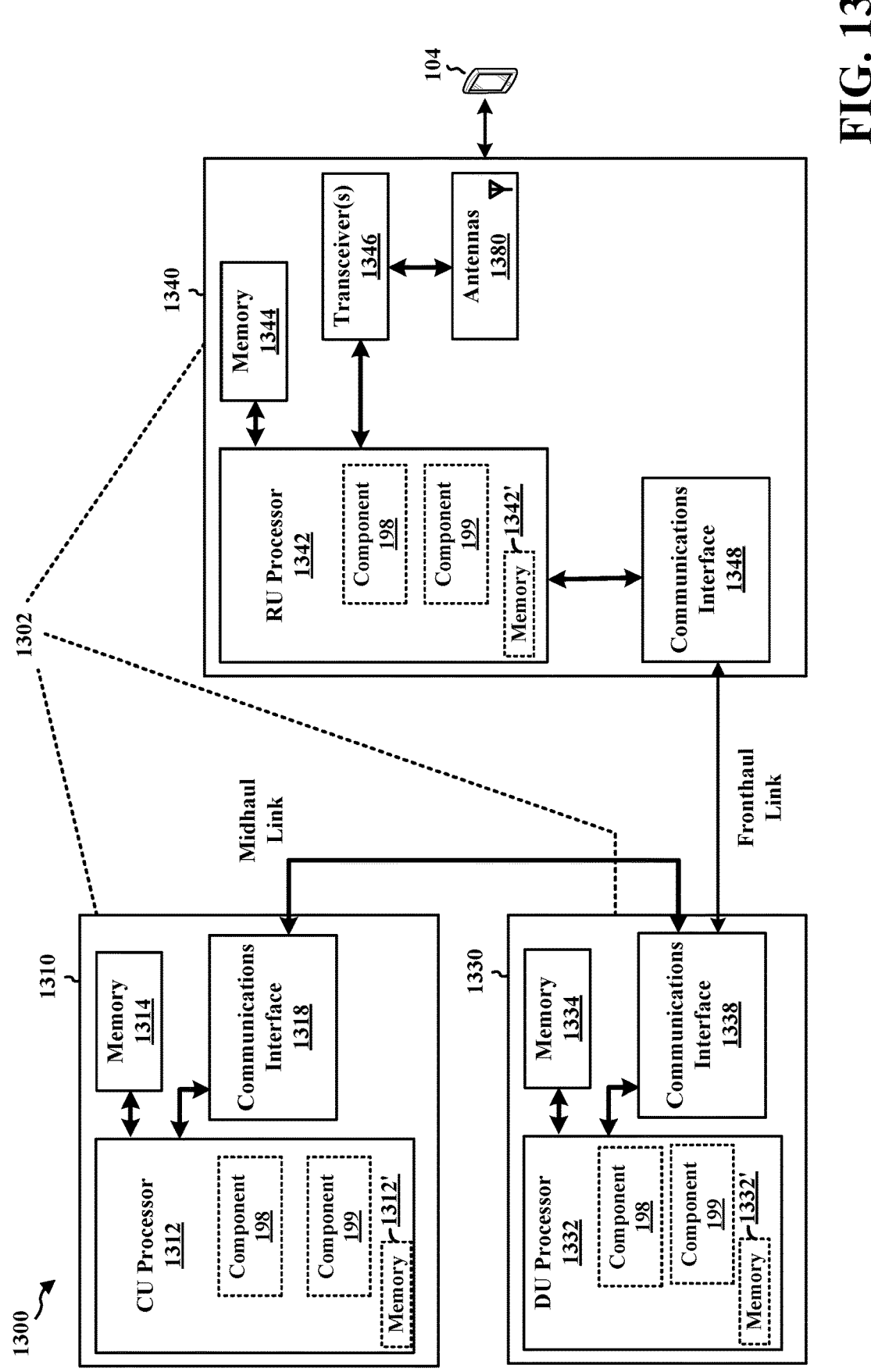
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 199, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332'. 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to receive a first set of SRSs and a second set of SRSs from a wireless device. The wireless device may be, for example, a UE, a PRU, or a network node. The component 198 may be configured to measure the first set of SRSs and the second set of SRSs. The component 198 may be configured to calculate a set of displacement RFFP measurements based on the measured first set of SRSs and measured second set of SRSs. The component 198 may be configured to output the set of displacement RFFP measurements to a positioning model to calculate a set of displacement information associated with the wireless device. The component 198 may be within one or more processors of one or more of the CU 1310, DU 1330, and the RU 1340. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 may include means for receiving a first set of SRSs and a second set of SRSs from a wireless device. The network entity 1302 may include means for measuring the first set of SRSs and the second set of SRSs. The network entity 1302 may include means for calculating a set of displacement RFFP measurements based on the measured first set of SRSs and measured second set of SRSs. The network entity 1302 may include means for outputting the set of displacement RFFP measurements to a positioning model to calculate a set of displacement information associated with the wireless device. The displacement RFFP measurements may include at least one of (a) a CIR, (b) a CFR, (c) a histogram of an RSSI, (d) an RSRP, (c) an RSRQ, (f) an AoA, (g) an AoD, (h) a delay spread, (i) an angle spread, or (j) a Doppler spread. The displacement RFFP measurements may include a composition of the aforementioned RFFP measurement types, for example a sum of CIRs from the measured first set of SRSs and the measured second set of SRSs. The network entity 1302 may include means for outputting the set of displacement RFFP measurements to the positioning model by calculating the set of displacement information using the positioning model based on the set of displacement RFFP measurements. The network entity 1302 may include means for receiving the first set of SRSs and the second set of SRSs by receiving the first set of SRSs during a first time period associated with a first position of the wireless device and receiving the second set of SRSs during a second time period associated with a second position of the wireless device. The second time period may not overlap with the first time period. The network entity 1302 may include means for calculating the second position based on the first position and the set of displacement information. The network entity 1302 may include means for outputting the set of displacement RFFP measurements to the positioning model by transmitting the set of displacement RFFP measurements to a second network node for calculating the set of displacement information using the positioning model based on the set of displacement RFFP measurements. The second network node may include an LMF or an OTT server. The network entity 1302 may include means for receiving a configuration for the positioning model from a second network node. The network entity 1302 may include means for outputting the set of displacement RFFP measurements to the positioning model by transmitting the calculated set of displacement RFFP measurements to the second network node for calculating a set of displacement information using the positioning model based on the configuration. The network entity 1302 may include means for outputting the set of displacement RFFP measurements to the positioning model by calculating the set of displacement information using the positioning model based on the set of displacement RFFP measurements. The network entity 1302 may include means for transmitting the calculated set of displacement information to the second network node based on the configuration. The second network node may include an LMF or an OTT server. The network entity 1302 may include means for receiving a request to indicate support for outputting the set of RFFP measurements to the positioning model. The network entity 1302 may include means for transmitting an indication of support to output the set of displacement RFFP measurements. The network entity 1302 may include means for receiving the first set of SRSs and the second set of SRSs in response to transmitting the indication of support. The means may be the component 198 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

As discussed supra, the component 199 may be configured to transmit a configuration for a positioning model associated with a first set of SRSs and a second set of SRSs to a first network node. The component 199 may be configured to receive a set of displacement RFFP measurements for the positioning model based on the first set of SRSs and the second set of SRSs. The component 199 may be configured to receive a set of displacement information calculated using the positioning model based on the set of RFFP measurements and the configuration. The component 199 may be within one or more processors of one or more of the CU 1310, DU 1330, and the RU 1340. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 may include means for transmitting a configuration for a positioning model associated with a first set of SRSs and a second set of SRSs to a first network node. The network entity 1302 may include means for receiving at least a set of displacement RFFP measurements for the positioning model based on the first set of SRSs and the second set of SRSs. The network entity 1302 may include means for receiving a set of displacement information calculated using the positioning model based on the set of RFFP measurements and the configuration. The second network node may include an LMF or an OTT server. The displacement RFFP measurements may include at least one of (a) a CIR, (b) a CFR, (c) a histogram of an RSSI, (d) an RSRP, (c) an RSRQ, (f) an AoA, (g) an AoD, (h) a delay spread, (i) an angle spread, or (j) a Doppler spread. The displacement RFFP measurements may include a composition of the aforementioned RFFP measurement types, for example a sum of CIRs from the measured first set of SRSs and the measured second set of SRSs. The network entity 1302 may include means for configuring the first set of SRSs for a first time period associated with a first position. The network entity 1302 may include means for configuring the second set of SRSs for a second time period associated with a second position. The second time period may not overlap with the first time period. The network entity 1302 may include means for configuring the configuration to calculate the second position using the positioning model based on the first position and the set of displacement information. The network entity 1302 may include means for calculating the second position using the positioning model based on the first position and the set of displacement information. The network entity 1302 may include means for calculating a set of displacement information using the positioning model based on the set of displacement RFFP measurements. The network entity 1302 may include means for transmitting a request to indicate support for outputting the set of RFFP measurements to the positioning model. The network entity 1302 may include means for receiving an indication of support to output the set of displacement RFFP measurements. The network entity 1302 may include means for transmitting the configuration in response to receiving the indication of support. The means may be the component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

Figure 14:
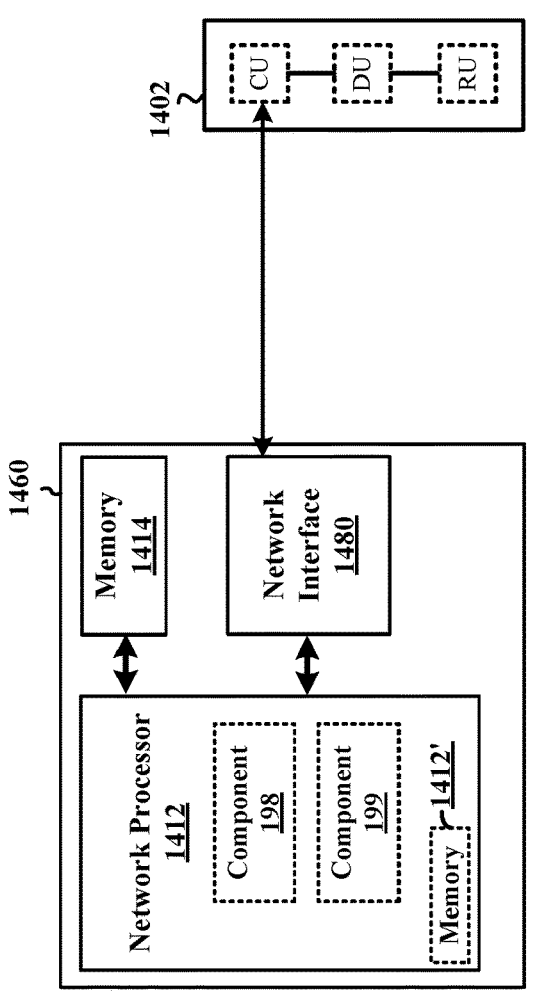
FIG. 14 is a diagram illustrating an example of a hardware implementation for an example network entity.

FIG. 14 is a diagram 1400 illustrating an example of a hardware implementation for a network entity 1460. In one example, the network entity 1460 may be within the core network 120. The network entity 1460 may include a network processor 1412. The network processor 1412 may include on-chip memory 1412'. In some aspects, the network entity 1460 may further include additional memory modules 1414. The network entity 1460 communicates via the network interface 1480 directly (e.g., backhaul link) or indirectly (e.g., through a RIC) with the CU 1402. The on-chip memory 1412' and the additional memory modules 1414 may each be considered a computer-readable medium/memory. Each computer-readable medium/memory may be non-transitory. The processor 1412 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 may be configured to receive a first set of SRSs and a second set of SRSs from a wireless device. The wireless device may be, for example, a UE, a PRU, or a network node. The component 198 may be configured to measure the first set of SRSs and the second set of SRSs. The component 198 may be configured to calculate a set of displacement RFFP measurements based on the measured first set of SRSs and measured second set of SRSs. The component 198 may be configured to output the set of displacement RFFP measurements to a positioning model to calculate a set of displacement information associated with the wireless device. The component 198 may be within the processor 1412. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1460 may include a variety of components configured for various functions. In one configuration, the network entity 1460 may include means for receiving a first set of SRSs and a second set of SRSs from a wireless device. The network entity 1460 may include means for measuring the first set of SRSs and the second set of SRSs. The network entity 1460 may include means for calculating a set of displacement RFFP measurements based on the measured first set of SRSs and measured second set of SRSs. The network entity 1460 may include means for outputting the set of displacement RFFP measurements to a positioning model to calculate a set of displacement information associated with the wireless device. The displacement RFFP measurements may include at least one of (a) a CIR, (b) a CFR, (c) a histogram of an RSSI, (d) an RSRP, (c) an RSRQ, (f) an AoA, (g) an AoD, (h) a delay spread, (i) an angle spread, or (j) a Doppler spread. The displacement RFFP measurements may include a composition of the aforementioned RFFP measurement types, for example a sum of CIRs from the measured first set of SRSs and the measured second set of SRSs. The network entity 1460 may include means for outputting the set of displacement RFFP measurements to the positioning model by calculating the set of displacement information using the positioning model based on the set of displacement RFFP measurements. The network entity 1460 may include means for receiving the first set of SRSs and the second set of SRSs by receiving the first set of SRSs during a first time period associated with a first position of the wireless device and receiving the second set of SRSs during a second time period associated with a second position of the wireless device. The second time period may not overlap with the first time period. The network entity 1460 may include means for calculating the second position based on the first position and the set of displacement information. The network entity 1460 may include means for outputting the set of displacement RFFP measurements to the positioning model by transmitting the set of displacement RFFP measurements to a second network node for calculating the set of displacement information using the positioning model based on the set of displacement RFFP measurements. The second network node may include an LMF or an OTT server. The network entity 1460 may include means for receiving a configuration for the positioning model from a second network node. The network entity 1460 may include means for outputting the set of displacement RFFP measurements to the positioning model by transmitting the calculated set of displacement RFFP measurements to the second network node for calculating a set of displacement information using the positioning model based on the configuration. The network entity 1460 may include means for outputting the set of displacement RFFP measurements to the positioning model by calculating the set of displacement information using the positioning model based on the set of displacement RFFP measurements. The network entity 1460 may include means for transmitting the calculated set of displacement information to the second network node based on the configuration. The second network node may include an LMF or an OTT server. The network entity 1460 may include means for receiving a request to indicate support for outputting the set of RFFP measurements to the positioning model. The network entity 1460 may include means for transmitting an indication of support to output the set of displacement RFFP measurements. The network entity 1460 may include means for receiving the first set of SRSs and the second set of SRSs in response to transmitting the indication of support. The means may be the component 198 of the network entity 1460 configured to perform the functions recited by the means.

As discussed supra, the component 198 may be configured to transmit a configuration for a positioning model associated with a first set of SRSs and a second set of SRSs to a first network node. The component 199 may be configured to receive a set of displacement RFFP measurements for the positioning model based on the first set of SRSs and the second set of SRSs. The component 199 may be configured to receive a set of displacement information calculated using the positioning model based on the set of RFFP measurements and the configuration. The component 198 may be within the processor 1412. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1460 may include a variety of components configured for various functions. In one configuration, the network entity 1460 may include means for transmitting a configuration for a positioning model associated with a first set of SRSs and a second set of SRSs to a first network node. The network entity 1460 may include means for receiving at least a set of displacement RFFP measurements for the positioning model based on the first set of SRSs and the second set of SRSs. The network entity 1460 may include means for receiving a set of displacement information calculated using the positioning model based on the set of RFFP measurements and the configuration. The second network node may include an LMF or an OTT server. The displacement RFFP measurements may include at least one of (a) a CIR, (b) a CFR, (c) a histogram of an RSSI, (d) an RSRP, (e) an RSRQ, (f) an AoA, (g) an AoD, (h) a delay spread, (i) an angle spread, or (j) a Doppler spread. The displacement RFFP measurements may include a composition of the aforementioned RFFP measurement types, for example a sum of CIRs from the measured first set of SRSs and the measured second set of SRSs. The network entity 1460 may include means for configuring the first set of SRSs for a first time period associated with a first position. The network entity 1460 may include means for configuring the second set of SRSs for a second time period associated with a second position. The second time period may not overlap with the first time period. The network entity 1460 may include means for configuring the configuration to calculate the second position using the positioning model based on the first position and the set of displacement information. The network entity 1460 may include means for calculating the second position using the positioning model based on the first position and the set of displacement information. The network entity 1460 may include means for calculating a set of displacement information using the positioning model based on the set of displacement RFFP measurements. The network entity 1460 may include means for transmitting a request to indicate support for outputting the set of RFFP measurements to the positioning model. The network entity 1460 may include means for receiving an indication of support to output the set of displacement RFFP measurements. The network entity 1460 may include means for transmitting the configuration in response to receiving the indication of support. The means may be the component 198 of the network entity 1460 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, may send the data to a device that transmits the data, or may output the data to a component or a module of the device that processes the data. A device configured to "obtain" data, such as a transmission, signal, or message, may receive the data, for example with a transceiver, may obtain the data from a component of the device that receives the data (e.g., an antenna), or may obtain the data from a component or a module of the device. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first network node, wherein the method comprises receiving a first set of sounding reference signals (SRSs) and a second set of SRSs from a wireless device. The method comprises measuring the first set of SRSs and the second set of SRSs. The method comprises calculating a set of displacement radio frequency fingerprint (RFFP) measurements based on the measured first set of SRSs and measured second set of SRSs. The method comprises outputting the set of displacement RFFP measurements to a positioning model to calculate a set of displacement information associated with the wireless device.

Aspect 2 is the method of aspect 1, wherein the set of displacement RFFP measurements comprises at least one of (a) a channel impulse response (CIR), (b) a channel frequency response (CFR), (c) a histogram of a reference signal strength indicator (RSSI), (d) a reference signal received power (RSRP), (e) a reference signal received quality (RSRQ), (f) an angle of arrival (AoA), (g) an angle of departure (AoD), (h) a delay spread, (i) an angle spread, or (j) a Doppler spread. The displacement RFFP measurements may include a composition of the aforementioned RFFP measurement types, for example a sum of CIRs from the measured first set of SRSs and the measured second set of SRSs.

Aspect 3 is the method of either of aspects 1 or 2, wherein outputting the set of displacement RFFP measurements to the positioning model comprises calculating the set of displacement information using the positioning model based on the set of displacement RFFP measurements.

Aspect 4 is the method of aspect 3, wherein receiving the first set of SRSs and the second set of SRSs comprises receiving the first set of SRSs during a first time period associated with a first position of the wireless device and receiving the second set of SRSs during a second time period associated with a second position of the wireless device. The second time period may not overlap with the first time period.

Aspect 5 is the method of aspect 4, wherein the method comprises calculating the second position based on the first position and the set of displacement information.

Aspect 6 is the method of any of aspects 1 to 5, wherein outputting the set of displacement RFFP measurements to the positioning model comprises transmitting the set of displacement RFFP measurements to a second network node for calculating the set of displacement information using the positioning model based on the set of displacement RFFP measurements.

Aspect 7 is the method of aspect 6, wherein the second network node comprises a location management function (LMF) or an over-the-top (OTT) server.

Aspect 8 is the method of any of aspects 1 to 7, wherein the method comprises receiving a configuration for the positioning model from a second network node.

Aspect 9 is the method of aspect 8, wherein outputting the set of displacement RFFP measurements to the positioning model comprises transmitting the calculated set of displacement RFFP measurements to the second network node for calculating a set of displacement information using the positioning model based on the configuration.

Aspect 10 is the method of aspect 8, wherein outputting the set of displacement RFFP measurements to the positioning model comprises calculating the set of displacement information using the positioning model based on the set of displacement RFFP measurements. The method comprises transmitting the calculated set of displacement information to the second network node based on the configuration.

Aspect 11 is the method of any of aspects 8 to 10, wherein the second network node comprises a location management function (LMF) or an over-the-top (OTT) server.

Aspect 12 is the method of any of aspects 1 to 11, wherein the method comprises receiving a request to indicate support to output the set of RFFP measurements to the positioning model. The method comprises transmitting an indication of support to output the set of displacement RFFP measurements, wherein receiving the first set of SRSs and the second set of SRSs is in response to the transmission of the indication of support.

Aspect 13 is a method of wireless communication at a second network node, wherein the method comprises transmitting a configuration for a positioning model associated with a first set of sounding reference signals (SRSs) and a second set of SRSs to a first network node. The method comprises receiving at least a set of displacement radio frequency fingerprint (RFFP) measurements for the positioning model based on the first set of SRSs and the second set of SRSs. The method comprises receiving a set of displacement information calculated using the positioning model based on the set of RFFP measurements and the configuration.

Aspect 14 is the method of aspect 13, wherein the second network node comprises a location management function (LMF) or an over-the-top (OTT) server.

Aspect 15 is the method of either of aspects 13 or 14, wherein the set of displacement RFFP measurements comprises at least one of (a) a channel impulse response (CIR), (b) a channel frequency response (CFR), (c) a histogram of a reference signal strength indicator (RSSI), (d) a reference signal received power (RSRP), (e) a reference signal received quality (RSRQ), (f) an angle of arrival (AoA), (g) an angle of departure (AoD), (h) a delay spread, (i) an angle spread, or (j) a Doppler spread. The displacement RFFP measurements may include a composition of the aforementioned RFFP measurement types, for example a sum of channel impulse responses (CIRs) from the measured first set of SRSs and the measured second set of SRSs.

Aspect 16 is the method of any of aspects 13 to 15, wherein the method comprises configuring the first set of SRSs for a first time period associated with a first position. The method comprises configuring the second set of SRSs for a second time period associated with a second position. The second time period may not overlap with the first time period. The method comprises configuring the configuration to calculate the second position using the positioning model based on the first position and the set of displacement information.

Aspect 17 is the method of aspect 16, wherein the method comprises calculating the second position using the positioning model based on the first position and the set of displacement information.

Aspect 18 is the method of any of aspects 13 to 17, wherein the method comprises calculating a set of displacement information using the positioning model based on the set of displacement RFFP measurements.

Aspect 19 is the method of any of aspects 13 to 18, wherein the method comprises transmitting a request to indicate support for outputting the set of RFFP measurements to the positioning model. The method comprises receiving an indication of support to output the set of displacement RFFP measurements. Transmitting the configuration may be in response to receiving the indication of support.

Aspect 20 is an apparatus for wireless communication, including: a memory; and at least one processor coupled to the memory and, based at least in part on information stored in the memory, the at least one processor is configured to implement any of aspects 1 to 19.

Aspect 21 is the apparatus of aspect 20, further including at least one of an antenna or a transceiver coupled to the at least one processor.

Aspect 22 is an apparatus for wireless communication including means for implementing any of aspects 1 to 19.

Aspect 23 is a computer-readable medium (e.g., a non-transitory computer-readable medium) storing computer executable code, wherein the code, when executed by a processor, causes the processor to implement any of aspects 1 to 19.

Aspect 24 is the method of any of aspects 1 to 19, wherein the wireless device comprises at least one of a user equipment (UE), a positioning reference unit (PRU), or a network node.

What is claimed is:

1. An apparatus for wireless communication at a first network node, comprising:
   memory; and
   at least one processor coupled to the memory and, based at least in part on information stored in the memory, the at least one processor is configured to:
   receive, from a wireless device, a first set of sounding reference signals (SRSs) during a first time period associated with a first position of the wireless device and a second set of SRSs during a second time period associated with a second position of the wireless device, wherein the first time period does not overlap with the second time period;
   measure the first set of SRSs and the second set of SRSs;
   calculate a set of displacement radio frequency fingerprint (RFFP) measurements based on the measured first set of SRSs and measured second set of SRSs; and
   output the set of displacement RFFP measurements to a positioning model to calculate a set of displacement information associated with the wireless device.

2. The apparatus of claim 1, wherein the set of displacement RFFP measurements comprises at least one of:
   a channel impulse response (CIR);
   a channel frequency response (CFR);

a histogram of a reference signal strength indicator (RSSI);
   a reference signal received power (RSRP);
   a reference signal received quality (RSRQ);
   an angle of arrival (AoA);
   an angle of departure (AoD);
   a delay spread;
   an angle spread; or
   a Doppler spread.

3. The apparatus of claim 1, wherein, to output the set of displacement RFFP measurements to the positioning model, the at least one processor is configured to:
   calculate the set of displacement information using the positioning model based on the set of displacement RFFP measurements.

4. The apparatus of claim 3, wherein, to receive the first set of SRSs and the second set of SRSs, the at least one processor is configured to:
   receive, via a transmission reception point (TRP), the first set of SRSs during the first time period associated with the first position of the wireless device; and
   receive, via the TRP, the second set of SRSs during the second time period associated with the second position of the wireless device.

5. The apparatus of claim 4, wherein the at least one processor is further configured to:
   calculate the second position based on the first position and the set of displacement information.

6. The apparatus of claim 1, wherein, to output the set of displacement RFFP measurements to the positioning model, the at least one processor is configured to:
   transmit the set of displacement RFFP measurements to a second network node to calculate the set of displacement information using the positioning model.

7. The apparatus of claim 6, wherein the second network node comprises a location management function (LMF) or an over-the-top (OTT) server.

8. The apparatus of claim 1, wherein the at least one processor is further configured to:
   receive a configuration for the positioning model from a second network node.

9. The apparatus of claim 8, wherein, to output the set of displacement RFFP measurements to the positioning model, the at least one processor is configured to:
   transmit the calculated set of displacement RFFP measurements to the second network node to calculate the set of displacement information using the positioning model based on the configuration.

10. The apparatus of claim 8, wherein, to output the set of displacement RFFP measurements to the positioning model, the at least one processor is configured to:
   calculate the set of displacement information using the positioning model based on the set of displacement RFFP measurements; and
   transmit the calculated set of displacement information to the second network node based on the configuration.

11. The apparatus of claim 8, wherein the second network node comprises a location management function (LMF) or an over-the-top (OTT) server.

12. The apparatus of claim 1, wherein the at least one processor is further configured to:
   receive a request to indicate support to output the set of RFFP measurements to the positioning model; and
   transmit an indication of support to output the set of displacement RFFP measurements, wherein, to receive the first set of SRSs and the second set of SRSs, the at least one processor is configured to receive the first set of SRSs and the second set of SRSs in response to the transmission of the indication of support.

13. The apparatus of claim 1, wherein the wireless device comprises at least one of a user equipment (UE), a positioning reference unit (PRU), or a network node.

14. The apparatus of claim 1, further comprising a transceiver coupled to the at least one processor, wherein to receive the first set of SRSs and the second set of SRSs, the at least one processor is configured to:

receive, via the transceiver, the first set of SRSs and the second set of SRSs from the wireless device.

15. An apparatus for wireless communication at a second network node, comprising:

memory; and at least one processor coupled to the memory and, based at least in part on information stored in the memory, the at least one processor is configured to:

transmit a configuration for a positioning model associated with a first set of sounding reference signals (SRSs) scheduled for transmission from a wireless device during a first time period associated with a first position of the wireless device and a second set of SRSs scheduled for transmission from the wireless device during a second time period associated with a second position of the wireless device to a first network node, wherein the first time period does not overlap with the second time period; and receive at least a set of displacement radio frequency fingerprint (RFFP) measurements for the positioning model based on the first set of SRSs scheduled for the transmission from the wireless device during the first time period associated with the first position of the wireless device and the second set of SRSs scheduled for the transmission from the wireless device during the second time period associated with the second position of the wireless device or receive a set of displacement information calculated using the positioning model based on the set of RFFP measurements and the configuration.

16. The apparatus of claim 15, wherein the second network node comprises a location management function (LMF) or an over-the-top (OTT) server.

17. The apparatus of claim 15, wherein the set of displacement RFFP measurements comprises at least one of:

a channel impulse response (CIR);

a channel frequency response (CFR);

a histogram of a reference signal strength indicator (RSSI);

a reference signal received power (RSRP);

a reference signal received quality (RSRQ);

an angle of arrival (AoA);

an angle of departure (AoD);

a delay spread;

an angle spread; or a Doppler spread.

18. The apparatus of claim 15, wherein the at least one processor is further configured to:

configure the first set of SRSs for transmission from the wireless device to a transmission reception point (TRP) during the first time period associated with the first position;

configure the second set of SRSs for transmission from the wireless device to a transmission reception point (TRP) during the second time period associated with the second position; and configure the configuration to calculate the second position using the positioning model based on the first position and the set of displacement information.

19. The apparatus of claim 18, wherein the at least one processor is further configured to:

calculate the second position using the positioning model based on the first position and the set of displacement information.

20. The apparatus of claim 15, wherein the at least one processor is further configured to:

calculate the set of displacement information using the positioning model based on the set of displacement RFFP measurements.

21. The apparatus of claim 15, wherein the at least one processor is further configured to:

transmit a request to indicate support for outputting the set of RFFP measurements to the positioning model; and receive an indication of support to output the set of displacement RFFP measurements, wherein, to transmit the configuration, the at least one processor is configured to transmit the configuration in response to the reception of the indication of support.

22. The apparatus of claim 15, further comprising a transceiver coupled to the at least one processor, wherein, to transmit the configuration, the at least one processor is configured to:

transmit, via the transceiver, the configuration for the positioning model associated with the first set of SRSs and the second set of SRSs to the first network node.

23. A method of wireless communication at a first network node, comprising:

receiving, from a wireless device, a first set of sounding reference signals (SRSs) during a first time period associated with a first position of the wireless device and a second set of SRSs during a second time period associated with a second position of the wireless device, wherein the first time period does not overlap with the second time period;

measuring the first set of SRSs and the second set of SRSs;

calculating a set of displacement radio frequency fingerprint (RFFP) measurements based on the measured first set of SRSs and measured second set of SRSs; and outputting the set of displacement RFFP measurements to a positioning model to calculate a set of displacement information associated with the wireless device.

24. The method of claim 23, wherein outputting the set of displacement RFFP measurements to the positioning model comprises:

calculating the set of displacement information using the positioning model based on the set of displacement RFFP measurements.

25. The method of claim 23, wherein outputting the set of displacement RFFP measurements to the positioning model comprises:

transmitting the set of displacement RFFP measurements to a second network node for calculating the set of displacement information using the positioning model.

26. The method of claim 23, further comprising:

receiving a request to indicate support for outputting the set of RFFP measurements to the positioning model; and transmitting an indication of support to output the set of displacement RFFP measurements, wherein receiving the first set of SRSs and the second set of SRSs is in response to transmitting the indication of support.

27. A method of communication at a second network node, comprising:

transmitting a configuration for a positioning model associated with a first set of sounding reference signals (SRSs) scheduled for transmission from a wireless device during a first time period associated with a first position of the wireless device and a second set of SRSs scheduled for transmission from the wireless device during a second time period associated with a second position of the wireless device to a first network node, wherein the first time period does not overlap with the second time period; and receiving at least a set of displacement radio frequency fingerprint (RFFP) measurements for the positioning model based on the first set of SRSs scheduled for the transmission from the wireless device during the first time period associated with the first position of the wireless device and the second set of SRSs scheduled for the transmission from the wireless device during the second time period associated with the second position of the wireless device or receive a set of displacement information calculated using the positioning model based on the set of RFFP measurements and the configuration.

28. The method of claim 27, further comprising:

configuring the first set of SRSs for the first time period associated with the first position;

configuring the second set of SRSs for the second time period associated with the second position; and configuring the configuration to calculate the second position using the positioning model based on the first position and the set of displacement information.

29. The method of claim 27, further comprising:

calculating the set of displacement information using the positioning model based on the set of displacement RFFP measurements.

30. The method of claim 27, further comprising:

transmitting a request to indicate support for outputting the set of RFFP measurements to the positioning model; and receiving an indication of support to output the set of displacement RFFP measurements, wherein transmitting the configuration is in response to receiving the indication of support.

\* \* \* \* \*